(12) United States Patent
Sawada et al.

(10) Patent No.: US 11,801,757 B2
(45) Date of Patent: Oct. 31, 2023

(54) CONTROL DEVICE FOR ELECTRIC VEHICLE AND CONTROL METHOD FOR ELECTRIC VEHICLE

(71) Applicant: NISSAN MOTOR CO., LTD., Yokohama (JP)

(72) Inventors: Akira Sawada, Kanagawa (JP); Takashi Nakajima, Kanagawa (JP); Kengo Fujiwara, Kanagawa (JP); Shou Oono, Kanagawa (JP); Yui Ito, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 132 days.

(21) Appl. No.: 17/442,998

(22) PCT Filed: Mar. 27, 2019

(86) PCT No.: PCT/JP2019/013434
§ 371 (c)(1),
(2) Date: Sep. 24, 2021

(87) PCT Pub. No.: WO2020/194621
PCT Pub. Date: Oct. 1, 2020

(65) Prior Publication Data
US 2022/0185121 A1 Jun. 16, 2022

(51) Int. Cl.
B60L 15/20 (2006.01)

(52) U.S. Cl.
CPC ........... *B60L 15/20* (2013.01); *B60L 2200/28* (2013.01); *B60L 2240/12* (2013.01);
(Continued)

(58) Field of Classification Search
CPC .. B60L 15/20; B60L 2200/28; B60L 2240/12; B60L 2240/16; B60L 2240/26;
(Continued)

(56) References Cited

U.S. PATENT DOCUMENTS

| 2012/0259536 A1 | 10/2012 | Klier |
| 2014/0129064 A1 | 5/2014 | Kim |

(Continued)

FOREIGN PATENT DOCUMENTS

| CA | 3059420 A1 | 8/2018 |
| EP | 3078539 A1 * | 10/2016 |

(Continued)

*Primary Examiner* — Michael J Zanelli
(74) *Attorney, Agent, or Firm* — Foley & Lardner LLP

(57) ABSTRACT

A control method for an electric vehicle in which a motor is used as a traveling drive source and deceleration is performed by a regenerative braking force of the motor, the electric vehicle including a towing unit configured to tow a separate object, the method including: acquiring an accelerator operation amount; acquiring a total mass of the electric vehicle; estimating a disturbance torque acting on the electric vehicle; acquiring an angular velocity of a rotary body; estimating a vehicle body speed of the electric vehicle; calculating a torque command value for the motor; measuring a load applied to the towing unit; correcting the total mass of the electric vehicle based on the measured load applied to the towing unit and the torque command value; controlling a torque generated in the motor based on the torque command value; and converging the torque command value to the disturbance torque.

12 Claims, 17 Drawing Sheets

(52) U.S. Cl.
CPC ....... *B60L 2240/16* (2013.01); *B60L 2240/26* (2013.01); *B60L 2240/423* (2013.01); *B60L 2250/28* (2013.01)

(58) Field of Classification Search
CPC ........... B60L 2240/423; B60L 2240/46; B60L 2250/28; B60L 2250/24; Y02T 10/72
See application file for complete search history.

(56) References Cited

U.S. PATENT DOCUMENTS

2016/0297303 A1* 10/2016 Sawada .................... B60L 3/08
2016/0297411 A1   10/2016 Trombley et al.
2017/0015163 A1    1/2017 Sielhorst
2017/0297563 A1* 10/2017 Kava .................. F02D 41/3005

FOREIGN PATENT DOCUMENTS

| EP | 3251887 A1 | * | 12/2017 |
| JP | H06245331 A | * | 9/1994 |
| JP | 2004064906 A | * | 2/2004 |
| JP | 2013106457 A | * | 5/2013 |
| JP | 2014-96973 A | | 5/2014 |
| JP | 2017-139230 A | | 8/2017 |
| JP | 2017-159711 A | | 9/2017 |
| WO | WO 2015/083213 A1 | | 6/2015 |
| WO | WO-2018139375 A1 | * | 8/2018 |

* cited by examiner

CONTROL DEVICE FOR ELECTRIC VEHICLE AND CONTROL METHOD FOR ELECTRIC VEHICLE

TECHNICAL FIELD

The present invention relates to a control device for an electric vehicle and a control method for an electric vehicle.

BACKGROUND ART

JP 2017-139230 discloses a control method for an electric vehicle that executes stop control in which a motor torque is adjusted as a motor rotation velocity decreases and the motor torque is converged to a disturbance torque estimated value, which is a substantially gradient load resistance, when an accelerator operation amount decreases and the electric vehicle is about to stop.

SUMMARY OF INVENTION

The above stop control is executed based on a vehicle body speed estimated by using a transmission characteristic from the motor rotation velocity to the vehicle body speed. As a result, regardless of a flat road, an uphill road, or a downhill road, always smooth deceleration without acceleration vibration can be realized when the vehicle is about to stop, and a stopped state can be maintained.

However, when a total mass of the vehicle changes due to, for example, an increase in a load capacity on the vehicle, tow of a trailer, or the like, the above transmission characteristic deviates from an actual transmission characteristic of the vehicle, and thus a stop distance of the electric vehicle may be longer than expected.

An object of the present invention is to provide a control device for an electric vehicle that prevents an increase in a stop distance of the electric vehicle and smoothly stops the electric vehicle even when a total mass of the electric vehicle changes.

A control method for an electric vehicle according to an aspect of the present invention is a control method for an electric vehicle in which a motor is used as a traveling drive source and deceleration is performed by a regenerative braking force of the motor. The control method for the electric vehicle includes: acquiring an accelerator operation amount; acquiring a total mass of the electric vehicle; estimating a disturbance torque acting on the electric vehicle; acquiring an angular velocity of a rotary body correlated with a rotation velocity of a driving shaft for driving the electric vehicle; estimating a vehicle body speed of the electric vehicle by using a transmission characteristic from the angular velocity of the rotary body to a speed of the electric vehicle; calculating a torque command value for the motor based on an acquired total mass of the electric vehicle; and controlling, based on the torque command value, a torque generated in the motor. The control method for the electric vehicle further includes: converging the torque command value to the disturbance torque as an estimated vehicle body speed decreases, when the accelerator operation amount is equal to or less than a predetermined value and the electric vehicle stops.

BRIEF DESCRIPTION OF DRAWINGS

FIG. 2 is a block diagram showing details of the control system shown in

FIG. 1.

DESCRIPTION OF EMBODIMENTS

Hereinafter, embodiments of the present invention will be described with reference to the accompanying drawings.

First Embodiment

Figure 1:
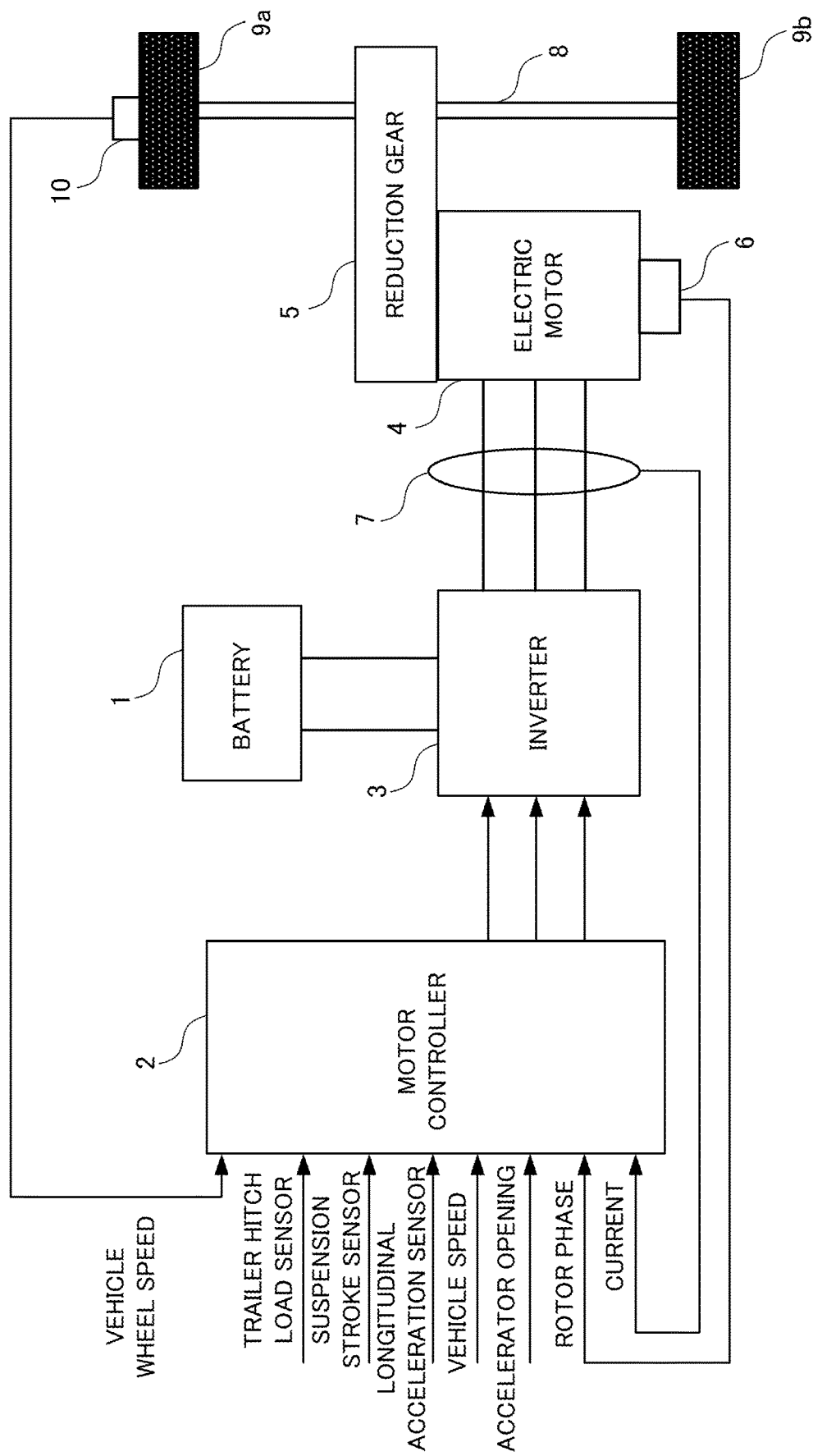
FIG. 1 is a block diagram showing a main configuration of a control system to which a control method for an electric vehicle according to a first embodiment is applied.

FIG. 1 is a block diagram showing an example of a main system configuration of an electric vehicle to which a control method for the electric vehicle according to the first embodiment is applied.

A control system 100 of the electric vehicle according to the present embodiment includes an electric motor 4 as a part or whole of a drive source of the vehicle, and can be applied to an electric vehicle that can travel by a driving force of the electric motor 4. The electric vehicle includes not only an electric automobile but also a hybrid automobile and a fuel cell automobile.

A control device for the electric vehicle shown in FIG. 1 controls acceleration/deceleration and stop of the vehicle only by operating an accelerator pedal. A driver of the electric vehicle depresses the accelerator pedal when accelerating, reduces a depressing amount of the accelerator pedal, or operates the depressing amount of the accelerator pedal to zero when decelerating or stopping. On an uphill road, the vehicle may approach a stopped state while the accelerator pedal is depressed in order to prevent the vehicle from moving backward.

A motor controller 2 inputs a signal indicating a vehicle state such as a vehicle body speed V, an accelerator opening AP, a rotor phase α of the electric motor 4, and currents iu, iv, and iw of the electric motor 4 as a digital signal. The motor controller 2 generates, based on the input signal, a PWM signal for controlling electric power supplied to the electric motor 4, and supplies the generated PWM signal to an inverter 3 to control turning-on and turning-off of switching elements of the inverter 3.

The inverter 3 converts a direct current supplied from a battery 1 into an alternating current by turning ON/OFF two switching elements (for example, power semiconductor elements such as IGBTs and MOS-FETs) for each phase, and causes a desired current to flow through the electric motor 4.

The electric motor 4 is realized by, for example, a three-phase AC motor. The electric motor 4 generates a driving force by using an alternating current output from the inverter 3, and transmits the driving force to left and right drive wheels 9a and 9b via a reduction gear 5 and a driving shaft 8. Further, when the electric motor 4 is rotated by the drive wheels 9a and 9b while the electric vehicle is traveling, the electric motor 4 recovers a kinetic energy of the electric vehicle as an electric energy by generating a regenerative driving force. In this case, the inverter 3 converts an alternating current generated during a regenerative operation of the electric motor 4 into a direct current and supplies the direct current to the battery 1.

A magnetic pole position sensor 6 is realized by, for example, a resolver or an encoder, and detects the rotor phase α of the electric motor 4.

A current sensor 7 detects three-phase alternating currents iu, iv, and iw supplied to the electric motor 4. However, a sum of the three-phase alternating currents iu, iv, and iw is 0 (zero), and thus currents of any two phases may be detected, and a current of remaining one phase may be obtained by calculation.

Figure 2:
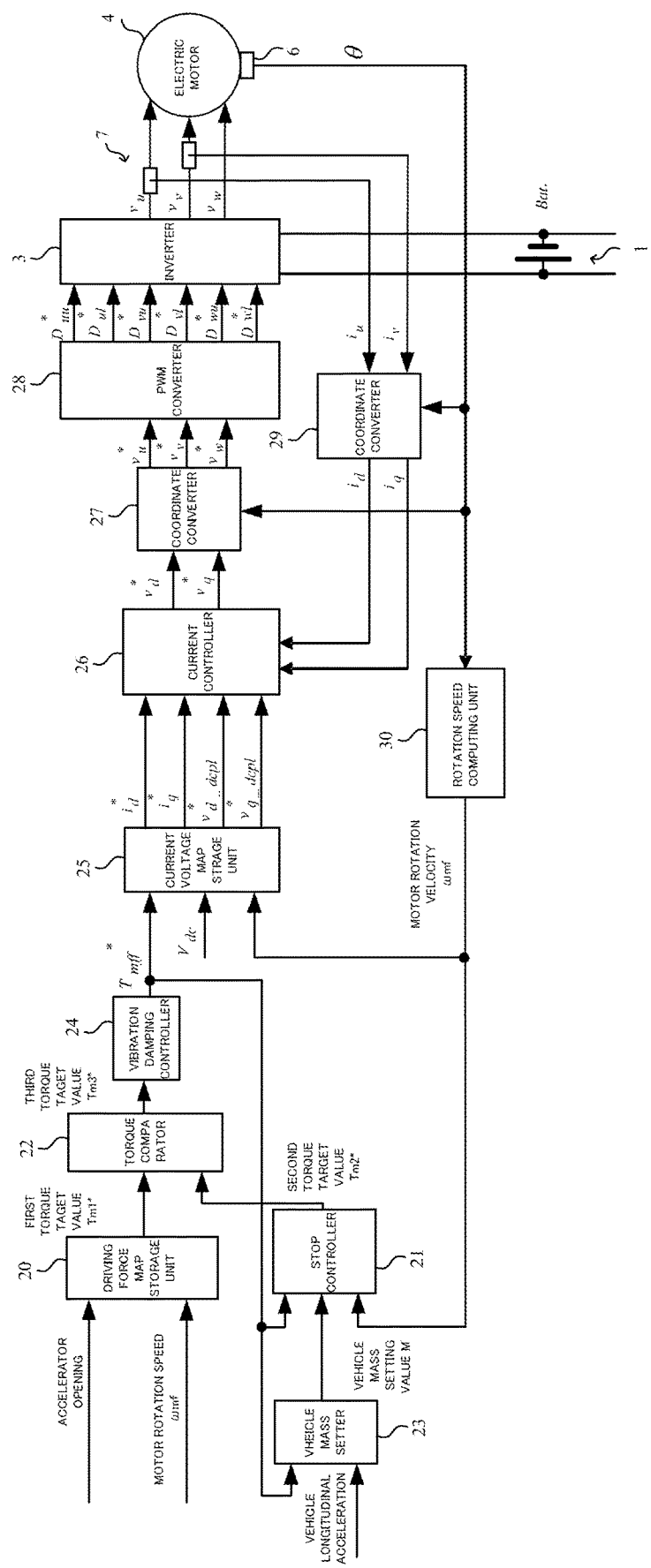

FIG. 2 is a block diagram showing details of the control system 100 of the vehicle, in particular, the controller 2, to which the control method of the electric vehicle according to the first embodiment is applied. The same components as those in FIG. 1 are donated by the same reference numerals, and a description thereof will be omitted.

The controller 2 in the present embodiment includes, as functional units thereof, a driving force map storage unit 20, a stop controller 21, a torque comparator 22, a vehicle mass setter 23, a vibration damping controller 24, a current voltage map storage unit 25, a current controller 26, coordinate converters 27 and 29, a PWM converter 28, and a rotation speed computing unit 30.

The driving force map storage unit 20 executes basic torque target value calculation processing (see step S201 to be described later). The driving force map storage unit 20 stores (memorizes) an accelerator opening-torque table to be described later, calculates a first torque target value Tm1 based on an accelerator opening θ and a motor rotation speed, and outputs the first torque target value Tm1 to the torque comparator 22.

The stop controller 21 and the torque comparator 22 execute stop control processing (see step S203 to be described later).

The stop controller 21 calculates, based on a final torque command value Tmff*, a motor rotation angular velocity ωmf, and a vehicle mass estimated value M^, a second torque target value Tm2 that converges to a disturbance torque estimated value Td as a speed parameter correlated with a rotation velocity of the drive shaft (driving shaft) 8 connected to the electric motor 4 decreases when the vehicle is stopped, and outputs the second torque target value Tm2 to the torque comparator 22.

The torque comparator 22 compares the first torque target value Tm1 with the second torque target value Tm2, and outputs a larger value to the vibration damping controller 24 as a third torque target value Tm3.

The vibration damping controller 24 executes vibration damping control processing (see step S204 to be described later). The vibration damping controller 24 applies the vibration damping control processing that prevents a vibration in a driving force transmission system such as a torsional vibration of the driving shaft with respect to a target torque command value Tm3*, and calculates the final torque command value Tmff*. The final torque command value Tmff* is output to the current voltage map storage unit 25.

The current voltage map storage unit 25 stores in advance a map using the final torque command value Tmff*, the motor rotation angular velocity ωmf, and a voltage detection value Vdc of the battery 1 input to the inverter 3 as indexes. The current voltage map storage unit 25 calculates d-axis and q-axis current command values id* and iq* and d-axis and q-axis non-interference voltage command values Vd_dcpl* and Vq_dcpl* based on the final torque command value Tmff*, the motor rotation angular velocity ωmf, and the voltage detection value Vdc of the battery 1, which are to be input, with reference to the above map, and outputs these command values to the current controller 26. The voltage detection value Vdc is acquired by a voltage sensor (not shown) provided in a DC power supply line from the battery 1 or a signal transmitted from a battery controller (not shown).

The d-axis and q-axis current command values id* and iq*, the d-axis and q-axis non-interference voltage command values Vd_dcpl* and Vq_dcpl*, and d-axis and q-axis current detection values id and iq output from the coordinate converter 29 are input to the current controller 26. The current controller 26 calculates d-axis and q-axis voltage command values Vd* and Vq* for following the d-axis and q-axis current detection values id and iq to the d-axis and q-axis current command values id* and iq* with desired responsiveness without steady deviation, and outputs the d-axis and q-axis voltage command values Vd* and Vq* to the coordinate converter 27. The current controller 26 in the present embodiment can be realized by a simple PI feedback compensator or a known compensator such as a so-called robust model matching compensator.

The coordinate converter 27 is input the d-axis and q-axis voltage command values Vd* and Vq* and a magnetic pole position detection value θ of a rotor provided in the motor 4, and calculates voltage command values v*u, v*v, and v*w of respective phases of u, v, and w by performing coordinate conversion processing using the following equation (1). The calculated values are output to the PWM converter 28.

[Equation 1]

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_d^* \\ v_q^* \end{bmatrix} \quad (1)$$

The PWM converter 28 generates strong electric element drive signals Duu*, Dul*, Dvu*, Dvl*, Dwu*, and Dwl* for driving the switching elements of the inverter 3 according to the voltage command values v*u, v*v, and v*w, and outputs these signals to the inverter 3. The inverter 3 converts DC voltages of the battery 1 to AC voltages vu, vv, and vw by driving the switching elements according to the strong electric element drive signals Duu*, Dul*, Dvu*, Dvl*, Dwu*, and Dwl*, and supplies these AC voltages to the electric motor 4.

At least currents of two phases (for example, iu and iv of a u-phase and a v-phase) detected by the current sensor 7 are input to the coordinate converter 29. In this case, the coordinate converter 29 obtains, by the following equation (2), a current value of remaining one phase (for example, iw of a W-phase) not detected by the current sensor 7. Then, the coordinate converter 29 calculates the d-axis and q-axis current command values id* and iq* by performing the coordinate conversion processing using the following equation (3) with respect to the three-phase current values iu, iv, and iw. The calculated values are output to the current controller 26.

[Equation 2]

$$i_w = -i_u - i_v \quad (2)$$

[Equation 3]

$$\begin{bmatrix} i_\gamma \\ i_\delta \end{bmatrix} = \begin{bmatrix} \cos\hat{\theta} & \sin\hat{\theta} \\ -\sin\hat{\theta} & \cos\hat{\theta} \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \quad (3)$$

The rotation speed computing unit 30 calculates the rotation angular velocity ωmf of the electric motor 4 based on a magnetic pole position θ of the electric motor 4 output from the magnetic pole position sensor 6, and outputs the rotation angular velocity ωmf to the current voltage map storage unit 25 and the stop controller 21. A front motor rotation angular velocity ωmf is also obtained by detecting the rotor phase α of the electric motor 4 and differentiating the rotor phase α.

Figure 3:
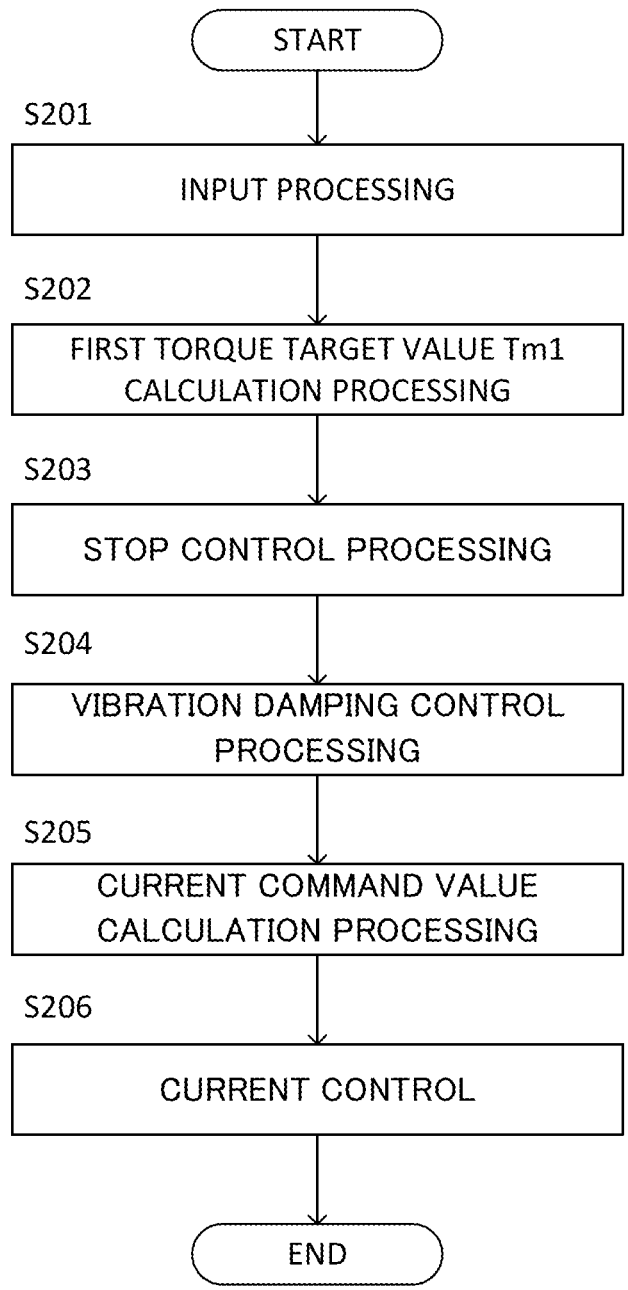
FIG. 3 is a flow of processing of motor current control performed by a motor controller to which the control method for the electric vehicle according to the first embodiment is applied.

FIG. 3 is a flowchart showing a flow of processing of motor current control performed by the motor controller 2.

In step S201, the motor controller 2 receives a signal indicating an operating state of the electric vehicle. The operating state herein includes a DC voltage value Vdc (V) between the battery 1 and the inverter 3, a vehicle body speed V (km/h) of the electric vehicle, the accelerator opening AP (%), a rotor phase α (rad) of the electric motor 4, a rotation speed Nm (rpm) of the electric motor 4, three-phase alternating current values iu, iv, and iw supplied to the electric motor 4, and the like.

The vehicle body speed V (km/h) is acquired from a vehicle speed sensor (not shown) or from another controller by communication.

Alternatively, the motor controller 2 obtains the vehicle speed v (m/s) by multiplying a rotor mechanical angular velocity ωm by a tire dynamic radius R and dividing a product of the multiplication by a gear ratio of a final gear, and obtains the vehicle body speed V (km/h) through unit conversion by multiplying the vehicle speed v (m/s) by 3600/1000.

The accelerator opening AP (%) is acquired from an accelerator opening sensor (not shown) or acquired, by communication, from another controller such as a vehicle controller (not shown).

The rotor phase α (rad) of the electric motor 4 is acquired from the magnetic pole position sensor 6. The rotation speed Nm (rpm) of the electric motor 4 is obtained by multiplying the motor rotation velocity ωm (rad/s), which is the mechanical angular velocity of the electric motor 4, by 60/(2π). The motor rotation velocity ωm (rad/s) is obtained by dividing the rotor angular velocity ω (electrical angle) by the number of pole pairs p of the electric motor 4. The rotor angular velocity ω is obtained by differentiating the rotor phase α.

The currents iu, iv, and iw (A) flowing through the electric motor 4 are acquired from the current sensor 7.

The DC voltage value Vdc (V) is obtained from the voltage sensor (not shown) provided in the DC power supply line between the battery 1 and the inverter 3, or is obtained from a power supply voltage value transmitted by the battery controller (not shown).

In step S202, the motor controller 2 sets the first torque target value Tm1. Specifically, the motor controller 2 sets the first torque target value Tm1 with reference to, for example, the accelerator opening-torque table based on the accelerator opening AP and the motor rotation speed input in step S201. The motor controller 2 may set the first torque target value Tm1 with reference to the accelerator opening-torque table based on the motor rotation velocity ωm instead of the motor rotation speed.

Figure 4:
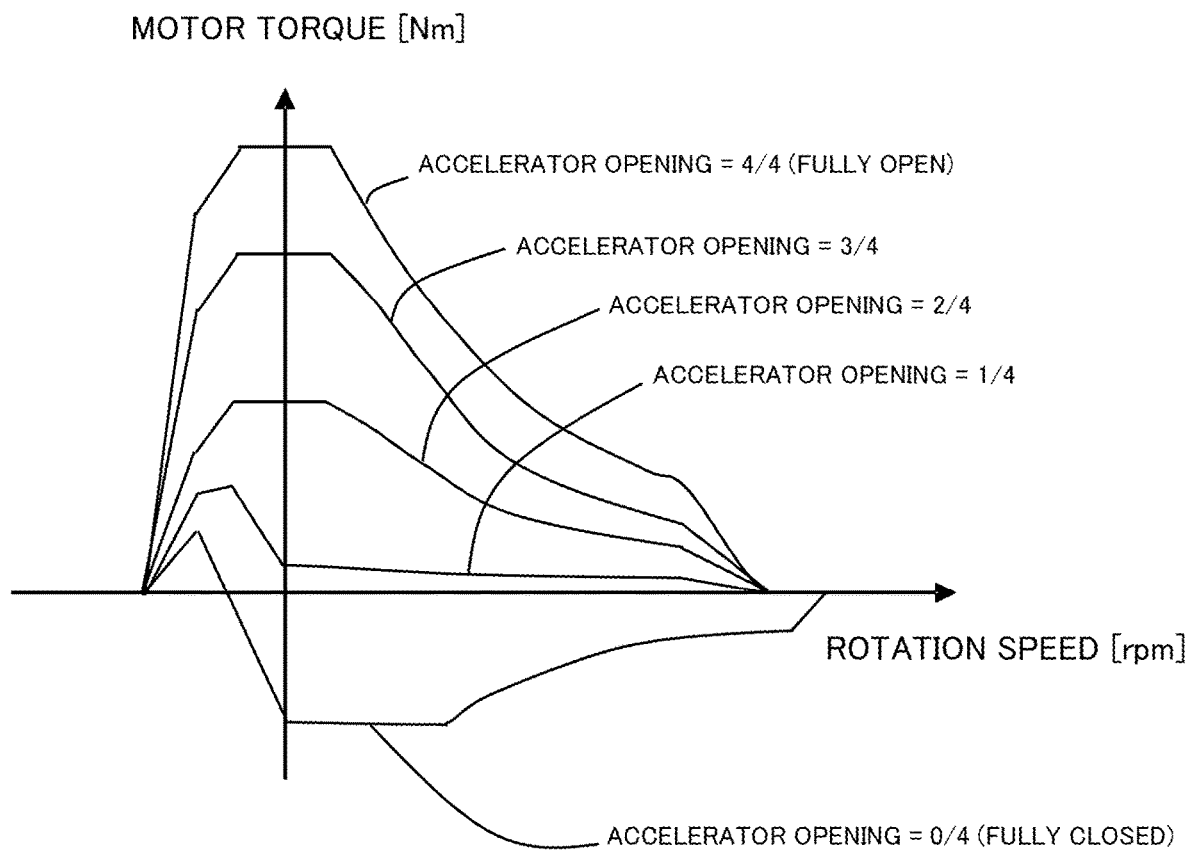
FIG. 4 is a diagram showing an example of an accelerator opening-torque table.

For example, in the accelerator opening-torque table shown in FIG. 4, a motor torque is set such that a motor regeneration amount is larger when the accelerator opening is 0 (fully closed). That is, when the motor rotation speed indicates a positive value and at least when the accelerator opening is 0 (fully closed), a negative motor torque is set such that a regenerative braking force acts on the electric vehicle. However, the illustrated accelerator opening-torque table is an example, and is not limited to the one shown in FIG. 4.

In step S203, the motor controller 2 (torque comparator 22) performs the stop control processing. Specifically, the motor controller 2 determines whether the electric vehicle is about to stop, and sets the first torque target value Tm1 calculated in step S202 to the motor torque command value Tm3* before the vehicle is about to stop. After the vehicle is about to stop, the second torque target value Tm2 that converges to the disturbance torque command value Td* as the motor rotation speed decreases is set to the motor torque command value Tm3*. The second torque target value Tm2 is a positive torque on an uphill road, a negative torque on a downhill road, and substantially zero on a flat road. As a result, as will be described later, the vehicle can be smoothly stopped and the stopped state can be maintained by the second torque target value regardless of a gradient of a road surface. The stop control processing will be described later in detail.

In step S204, the motor controller 2 (vibration damping controller 24) performs the vibration damping control processing that prevents the vibration in the driving force transmission system such as the torsional vibration of the driving shaft 8 without wasting a driving shaft torque. Specifically, the motor controller 2 calculates the motor torque command value Tmff* subjected to the vibration damping control processing based on the motor torque command value Tm3* set in step S202 and the motor rotation velocity ωm. The vibration damping control processing will be described later in detail. In the following description, it is assumed that the first torque target value Tm1 is set based on the motor rotation velocity ωm.

In step S205, the motor controller 2 (current voltage map storage unit 25) obtains a d-axis current target value id and a q-axis current target value iq based on the motor torque command value Tmff*, the motor rotation velocity ωm, and the DC voltage value Vdc. For example, a table is prepared in advance for obtaining a relation between the motor torque command value, the motor rotation velocity, the DC voltage value, and the d-axis current target value and the q-axis current target value through experimental results or simulation results. Then, when the motor torque command value Tmff*, the motor rotation velocity ωm, and the DC voltage value Vdc are acquired, the motor controller 2 obtains the d-axis current target value id and the q-axis current target value iq with reference to the above table prepared.

In step S206, the motor controller 2 (current voltage map storage unit 25) performs current control for matching a d-axis current id and a q-axis current iq with the d-axis current target value id and the q-axis current target value iq, respectively.

Specifically, the motor controller 2 (current controller 26) obtains the d-axis current id and the q-axis current iq based on the three-phase alternating current values iu, iv, and iw input in step S201 and the rotor phase α of the electric motor 4. Next, the motor controller 2 calculates d-axis and q-axis voltage command values vd and vq based on a deviation between the d-axis and q-axis current target values id and iq and the d-axis and q-axis currents id and iq.

A non-interference voltage required to cancel an interference voltage between d-q orthogonal coordinate axes may be added to the d-axis and q-axis voltage command values vd and vq calculated by the motor controller 2.

Next, the motor controller 2 (coordinate converter 27) obtains PWM signals to (%), tv (%), and tw (%) based on the d-axis and q-axis voltage command values vd and vq, the rotor phase α of the electric motor 4, three-phase AC voltage command values vu*, vv*, and vw*, and the DC voltage value Vdc. By turning ON/OFF the switching elements of the inverter 3 according to the PWM signals tu, tv, and tw obtained in this way, the electric motor 4 can be driven with a desired torque indicated by the motor torque command value Tmff*.

Next, when describing the stop control processing performed in step S203, firstly, a transmission characteristic Gp(s) from a motor torque Tm of the electric vehicle to the motor rotation velocity ωm in the present embodiment will be described.

Figure 5:
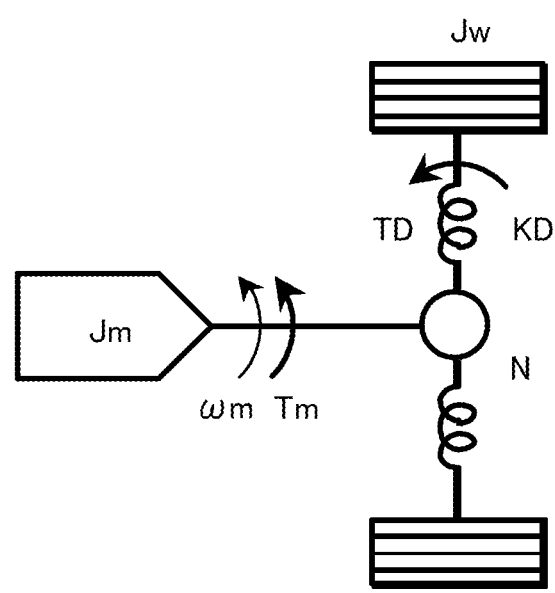
FIG. 5 is a diagram obtained by modeling a driving force transmission system of the vehicle.
Figure 6:
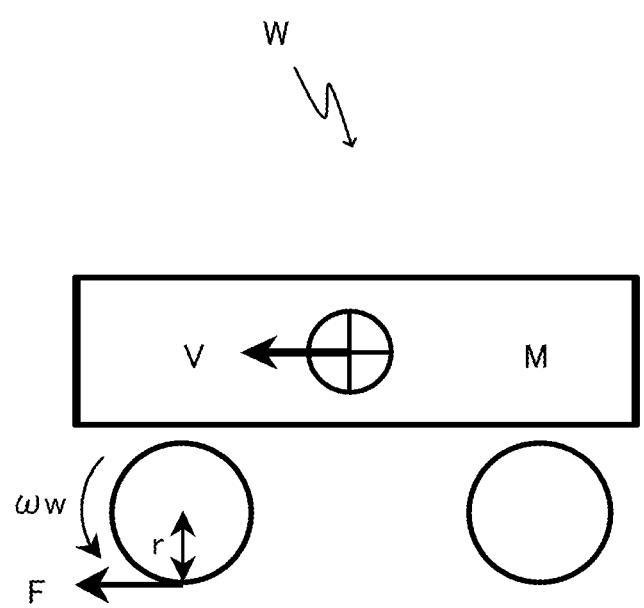
FIG. 6 is a diagram obtained by modeling the driving force transmission system of the vehicle.

FIGS. 5 and 6 are diagrams obtained by modeling the driving force transmission system of the vehicle, and each parameter in the figures is as follows.

$J_m$: Electric motor inertia
$J_w$: Drive wheel inertia
M: Total mass of vehicle
$K_d$: Torsional rigidity of drive system
$K_t$: Coefficient for friction between tire and road surface
N: Overall gear ratio
r: Loaded radius of tire
$ω_m$: Motor rotation velocity
$T_m^*$: Motor torque command value
$T_d$: Drive wheel torque
F: Driving force applied to vehicle
V: Speed of vehicle body (vehicle body speed)
$ω_w$: Angular velocity of drive wheel The following motion equations can be derived by using models of the driving force transmission system shown in FIGS. 5 and 6.

[Equation 4]

$$J_m \cdot \dot{ω}_m = T_m - T_d/N \quad (4)$$

[Equation 5]

$$2J_w \cdot \dot{ω}_w = T_d - r \cdot F \quad (5)$$

[Equation 6]

$$M\dot{V} = F \quad (6)$$

[Equation 7]

$$T_d = K_d \int (ω_m/N - ω_w) dt \quad (7)$$

[Equation 8]

$$F = K_t(r \cdot ω_w - V) \quad (8)$$

When a transmission characteristic Gp(s), which is a transmission function from a motor torque Tm of the electric motor 4 to the motor rotation velocity ωm, is obtained based on the motion equations represented by the above equations (4) to (8), the transmission characteristic Gp(s) is represented by the following equation (9). The transmission characteristic Gp(s) is also used as a vehicle model Gp(s) that simulates the transmission characteristic.

[Equation 9]

$$G_p(s) = \frac{1}{s} \cdot \frac{b_3 s^3 + b_2 s^2 + b_1 s + b_0}{a_3 s^3 + a_2 s^2 + a_1 s + a_0} \quad (9)$$

However, each parameter in the equation (9) is represented by the following equation (10).

[Equation 10]

$$a_3 = 2J_m J_w M$$

$$a_2 = K_t J_m (2J_w + r^2 M)$$

$$a_1 = K_d M(J_m + 2J_w/N^2)$$

$$a_0 = K_d K_t (J_m + 2J_w/N^2 + r^2 M/N^2)$$

$$b_3 = 2J_w M$$

$$b_2 = K_t(2J_w + r^2 M)$$

$$b_1 = K_d M$$

$$b_0 = K_d K_t \quad (10)$$

When a pole and a zero point of the transmission characteristic Gp(s) represented by the above equation (9) are examined, the transmission characteristic Gp(s) can be approximated to a transmission characteristic represented by the following equation (11), and one pole and one zero point indicate extremely close values. This means that α and β in the transmission characteristic Gp(s) in the equation (11) indicate extremely close values.

[Equation 11]

$$G_p(s) = \frac{1}{s} \cdot \frac{(s+\beta) \cdot (b'_2 s^2 + b'_1 s + b'_0)}{(s+\alpha) \cdot (s^2 + 2\zeta_p \omega_p s + \omega_p^2)} \quad (11)$$

Therefore, a vehicle model Gp(s) derived by performing pole-zero cancellation (approximate to α=β) in the above equation (11) has (secondary)/(tertiary) transmission characteristics as shown in the following equation (12).

[Equation 12]

$$G_p(s) = \frac{1}{s} \cdot \frac{b'_2 s^2 + b'_1 s + b'_0}{s^2 + 2\zeta_p \omega_p s + \omega_p^2} \quad (12)$$

According to the vehicle model Gp(s) and a vibration damping control algorithm, the vehicle model Gp(s) in the equation (12) can be regarded as a transmission characteristic Gr(s) shown in the following equation (13).

[Equation 13]

$$G_r(s) = \frac{1}{s} \cdot \frac{b'_2 s^2 + b'_1 s + b'_0}{s^2 + 2\omega_p s + \omega_p^2} \quad (13)$$

Next, a transmission characteristic Gpv(s) from the motor torque Tm to the vehicle body speed V will be described.

When the transmission characteristic Gpv(s) is obtained based on the above equations (4) to (8), the transmission characteristic Gpv(s) is represented by the following equation (14).

[Equation 14]

$$G_{pV}(s) = \frac{1}{s} \cdot \frac{c_0}{(s+\alpha) \cdot (s^2 + 2\zeta_p \omega_p s + \omega_p^2)} \quad (14)$$

When a transmission characteristic Gωv(s) from the motor rotation velocity ωm to the vehicle body speed V is obtained based on the above equations (11) and (14), the transmission characteristic Gωv(s) is represented by the following equation (15).

[Equation 15]

$$G_{\omega V}(s) = \frac{G_{pV}(s)}{G_p(s)} = \frac{c_0}{(s+\beta) \cdot (b'_2 s^2 + b'_1 s + b'_0)} \quad (15)$$

Next, a transmission characteristic GpF(s) from the motor torque Tm to a driving force F of the electric vehicle will be described. When the transmission characteristic GpF(s) is obtained based on the above equations (4) to (8), the transmission characteristic GpF(s) is represented by the following equation (16).

[Equation 16]

$$G_{pF}(s) = \frac{c_0}{(s+\alpha) \cdot (s^2 + 2\zeta_p \omega_p s + \omega_p^2)} \quad (16)$$

Next, the stop control processing performed in step S203 of FIG. 3 will be described in detail.

Figure 7:
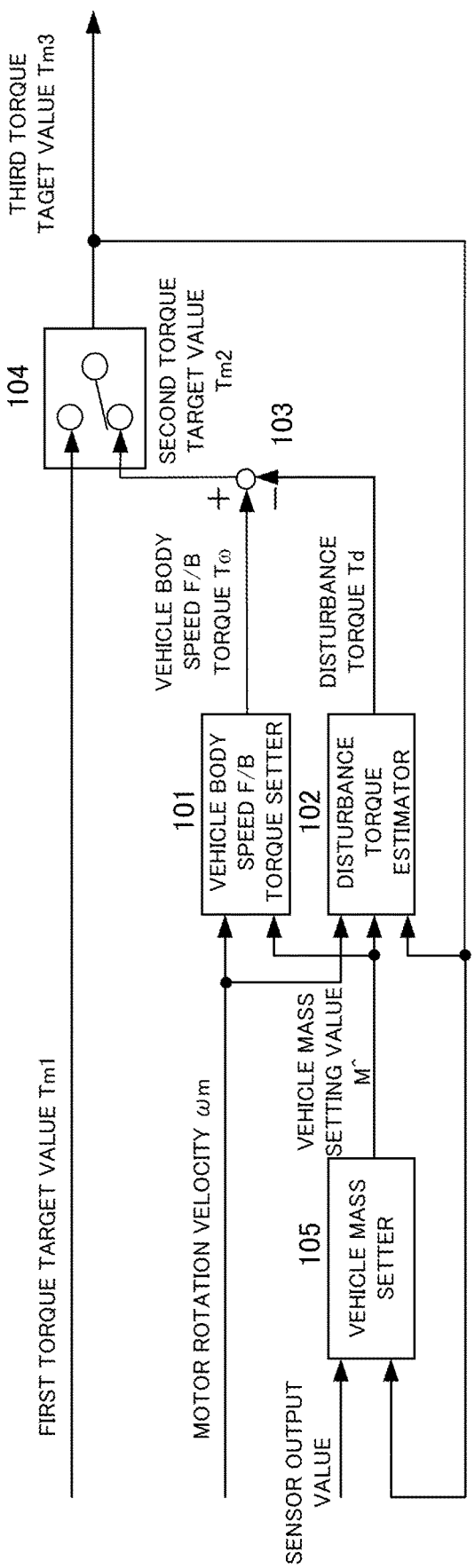
FIG. 7 is a block diagram for realizing stop control processing.

FIG. 7 is a block diagram showing an example of a functional configuration for realizing the stop control processing. FIG. 7 shows, as the functional configuration for realizing the stop control processing, a vehicle body speed F/B torque setter 101, a disturbance torque estimator 102, a subtractor 103, a torque comparator 104, and a vehicle mass setter 105.

The vehicle body speed F/B torque setter 101 calculates, based on the detected motor rotation velocity ωm, a vehicle body speed feedback torque Tω (hereinafter referred to as a vehicle body speed F/B torque Tω) for stopping the electric vehicle using a regenerative braking force of the electric motor 4.

Figure 8:
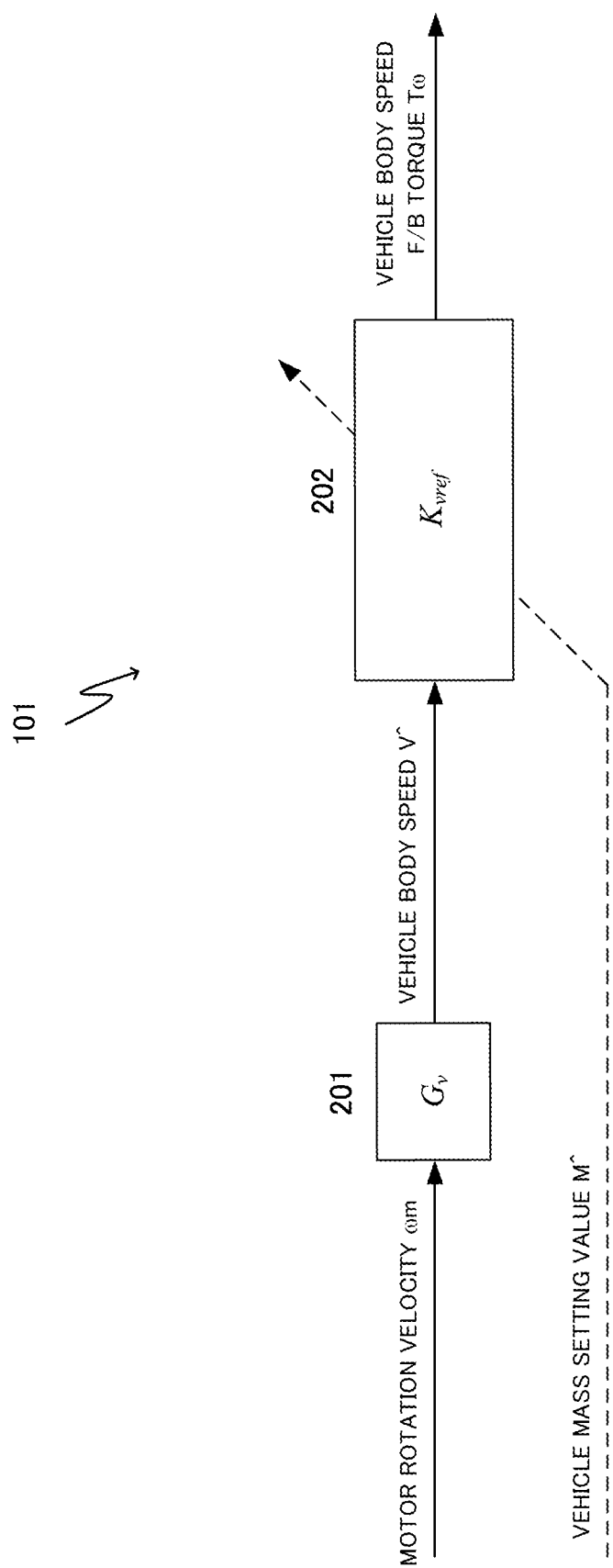
FIG. 8 is a diagram illustrating a method of calculating a vehicle body speed F/B torque by estimating a vehicle body speed.

FIG. 8 is a diagram showing details of the vehicle body speed F/B torque setter 101, and is a diagram illustrating a method for calculating the vehicle body speed F/B torque Tω based on the motor rotation velocity ωm.

The vehicle body speed F/B torque setter 101 includes a control block 201 and a multiplier 202.

The control block 201 functions as a filter that simulates or approximates the transmission characteristic Gωv(s) of the above equation (15), that is, a filter having the transmission characteristic Gωv(s). Therefore, the control block 201 is input the motor rotation velocity ωm and performs filtering processing in consideration of the transmission characteristic Gωv(s) to calculate an estimated vehicle body speed V^ indicating an estimated value of the vehicle body speed V.

The transmission characteristic Gωv(s) in the equation (15) can be approximated as in the following equation (17).

[Equation 17]

$$G'_{\omega V}(s) = \frac{c'_0}{(s + \tau_{\omega V})} \quad (17)$$

Therefore, the control block 201 may perform the filtering processing using a transmission characteristic Gωv(s) in the equation (17) instead of the transmission characteristic Gωv(s) in the equation (15). As a result, computing processing can be reduced as compared with the case where the transmission characteristic Gωv(s) in the equation (15) is used.

A pole ωp specified by the equation (16) may be used instead of a time constant τωv in the above equation (17). In this way, it is possible to calculate the estimated vehicle body speed V^ by using one pole of a denominator of a transmission characteristic from the motor rotation velocity ωm to the vehicle body speed V.

Further, the control block 201 may perform filtering processing in consideration of the transmission characteristic GpF(s) from the motor torque Tm to the driving force F of the electric vehicle in the above equation (16) in addition to the transmission characteristic Gωv(s) from the motor rotation velocity ωm to the vehicle body speed V in the above equation (15). For example, the control block 201 performs filtering processing having a transmission characteristic Gωv(s) in the following equation (18).

[Equation 18]

$$G_{\omega V} = k \frac{(s+\alpha)\cdot(s^2 + 2\zeta_p\omega_p s + \omega_p^2)}{(s+\beta)\cdot(b_2' s^2 + b_1' s + b_0')} \quad (18)$$

In the above equation (18), by multiplying a gain k in consideration of a gear ratio, the tire dynamic radius, and the like, an input of the transmission characteristic Gωv(s) can be set to the motor rotation velocity ωm, and an output thereof can be set to the estimated vehicle body speed V^.

By applying the transmission characteristic Gωv(s) in the above equation (18) to the control block 201, it is possible to calculate the third torque target value Tm3, which is a motor torque command value in consideration of a transmission characteristic from the motor torque Tm to the driving force F of the electric vehicle.

A transmission characteristic GpF(s) in the following equation (19) may be used instead of the transmission characteristic GpF(s) in the equation (16).

[Equation 19]

$$G_{pF}(s) = \frac{c_0}{(s^2 + 2\zeta_p\omega_p s + \omega_p^2)} \quad (19)$$

The transmission characteristic GpF(s) in the above equation (19) is a characteristic that approximates a pole a far from an origin on a complex plane in the transmission characteristic GpF(s) in the equation (16).

As described above, the control block 201 calculates the estimated vehicle body speed V^ by using one or more poles of the denominator specified by the transmission characteristic Gωv(s) from the motor rotation velocity ωm to the vehicle body speed V.

The multiplier 202 calculates the vehicle body speed F/B torque Tω by multiplying the estimated vehicle body speed V^ by a predetermined gain Kvref. A vehicle mass estimated value M^ set in the vehicle mass setter 105 (see FIG. 7) is input to the multiplier 202. The multiplier 202 determines the gain Kvref according to the input vehicle mass estimated value M^. The vehicle mass setter 105 will be described later in detail.

An appropriate value of the gain Kvref may be derived in advance by simulation, experiment, or the like, and stored in the multiplier 202 in a table format associated with the vehicle mass estimated value M^ and the estimated vehicle body speed V^. In this case, the multiplier 202 determines the gain Kvref according to the vehicle mass estimated value M^ with reference to the table when calculating the vehicle body speed F/B torque.

Figure 9:
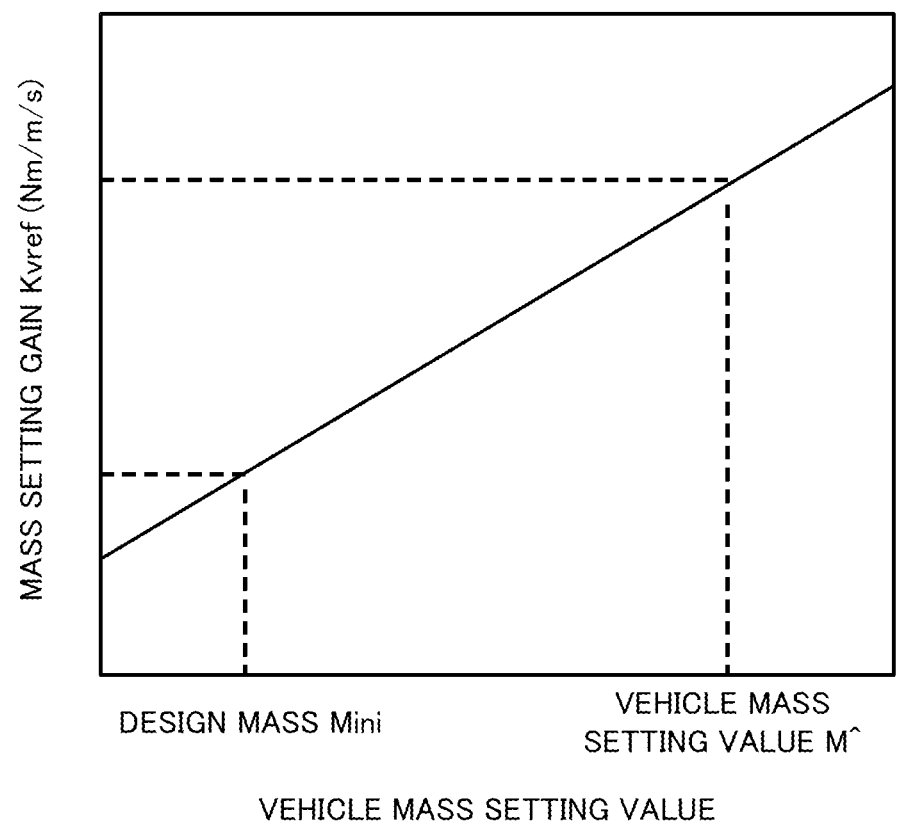
FIG. 9 is a diagram showing a relation between a mass setting value and a mass setting gain in the first embodiment.

FIG. 9 is a diagram showing an example of a relation between the vehicle mass estimated value M^ and the gain Kvref. A design mass Mini in FIG. 9 is a mass of the vehicle itself at the time of shipment, and the vehicle mass estimated value M^ is a total mass of the vehicle when a person gets on the vehicle or luggage is loaded. The total mass of the vehicle in the present embodiment is a total mass of the vehicle including a vehicle occupant mass, a vehicle load mass, a mass of a trailer T when the trailer T and the like is towed, and the like, with respect to the design mass Mini, which is the mass of the vehicle itself. The design mass Mini does not necessarily have to be a value of the mass of the vehicle alone, for example, a mass of several occupants may be included in advance.

As shown in FIG. 9, an absolute value of the gain Kvref is set larger as the vehicle mass estimated value M^ increases. However, the gain Kvref is premised on taking a negative (minus) value in order to stop the electric vehicle when the electric vehicle is about to stop. As a result, the vehicle body speed F/B torque Tω is set to a torque value such that a larger regenerative braking force can be obtained as the estimated vehicle body speed V^ increases.

The vehicle body speed F/B torque setter 101 has been described as calculating the vehicle body speed F/B torque Tω by multiplying the estimated vehicle body speed V" by the gain Kvref, but also may calculate the vehicle body speed F/B torque Tω using a regenerative torque table on which a relation between the estimated vehicle body speed V^ and a regenerative torque is stored in advance, or an attenuation rate table on which an attenuation rate of the estimated vehicle body speed V^ is stored in advance.

The disturbance torque estimator 102 shown in FIG. 7 calculates the disturbance torque estimated value Td based on the motor rotation velocity ωm, the third torque target value Tm3, and the vehicle mass estimated value M^.

Figure 10:
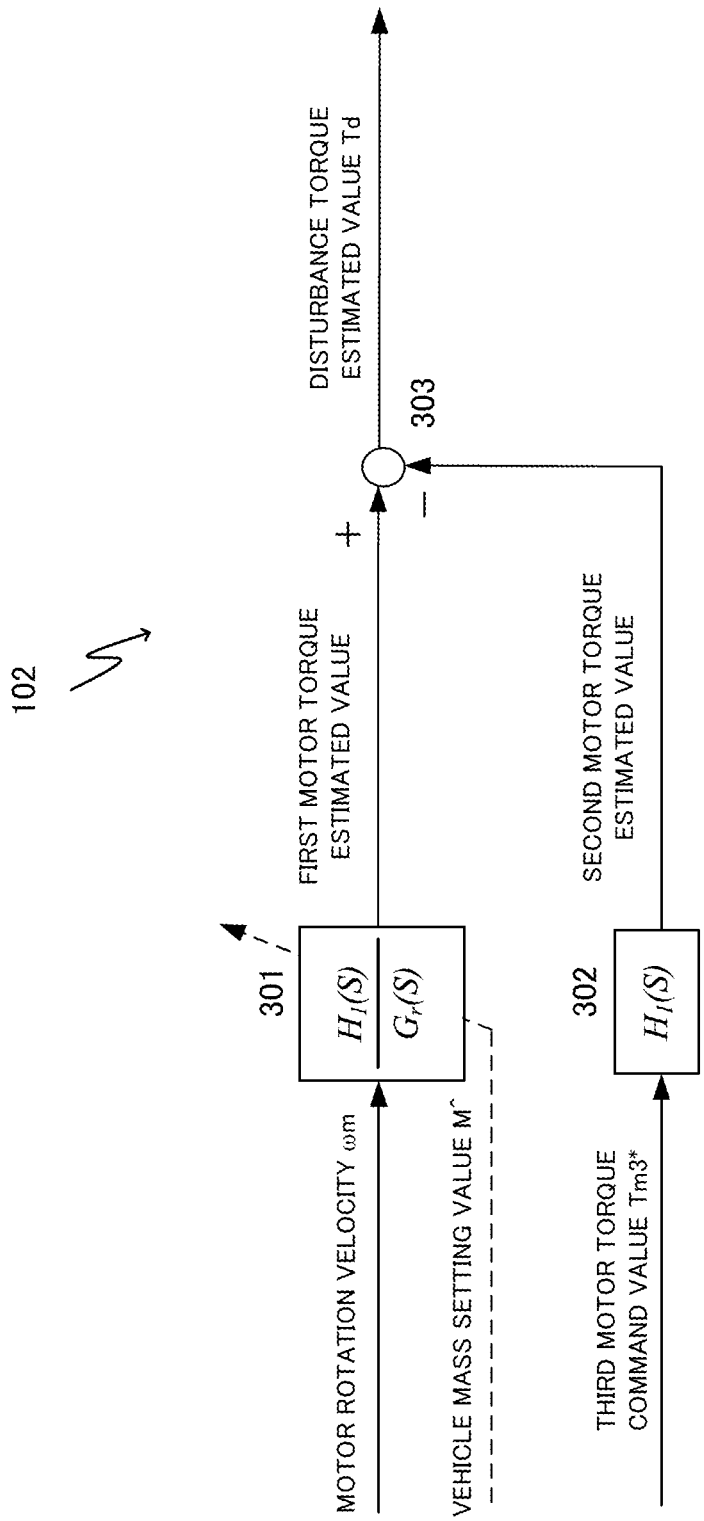
FIG. 10 is a diagram illustrating a method of calculating a disturbance torque estimated value in the first embodiment.

FIG. 10 is a diagram showing details of the disturbance torque estimator 102. With reference to FIG. 10, the disturbance torque estimator 102 includes a control block 301, a control block 302, and a subtractor 303.

The control block 301 functions as a filter having a transmission characteristic of H1(s)/Gr(s), and calculates a first motor torque estimated value by inputting the motor rotation velocity ωm and performing filtering processing.

In transmission characteristics of the control block 301, Gr(s) constituting a denominator is the transmission characteristic shown in the above equation (10), and is a vehicle model derived from the vehicle model Gp(s) in the equation (9) and the vibration damping control algorithm. Further, H1(s) constituting a numerator of the transmission characteristic is a low-pass filter having a transmission characteristic in which a difference between a denominator order and a numerator order is equal to or greater than a difference between a denominator order and a numerator order of the vehicle model Gp(s).

Further, the vehicle mass estimated value M^ set by the vehicle mass setter 105 is input to the control block 301. The control block 301 corrects, according to the input vehicle mass estimated value M^, a mass component included in Gr(s) constituting the denominator. Specifically, for example, by correcting M included in b 1 in the equation (10) to the vehicle mass estimated value M^, the transmission characteristic Gr(S) in the equation (13) including b 1 is corrected based on the vehicle mass estimated value M^. As a result, the first motor torque estimated value calculated by the control block 301 is calculated as a value corresponding to the vehicle mass estimated value M^.

The control block 302 functions as a filter having a transmission characteristic H1(s), and calculates a second motor torque estimated value by inputting the third torque target value Tm3 and performing filtering processing in consideration of the transmission characteristic H1(s).

The subtractor 303 outputs a deviation between the first motor torque estimated value and the second motor torque estimated value as the disturbance torque estimated value Td. The subtractor 303 in the present embodiment calculates the disturbance torque estimated value Td by subtracting the first motor torque estimated value from the second motor torque estimated value.

The vehicle mass setter 105 shown in FIG. 7 sets the vehicle mass estimated value M^, which is the total mass of the vehicle, based on parameters acquired by sensors provided in the vehicle and the third torque target value Tm3.

Figure 11:
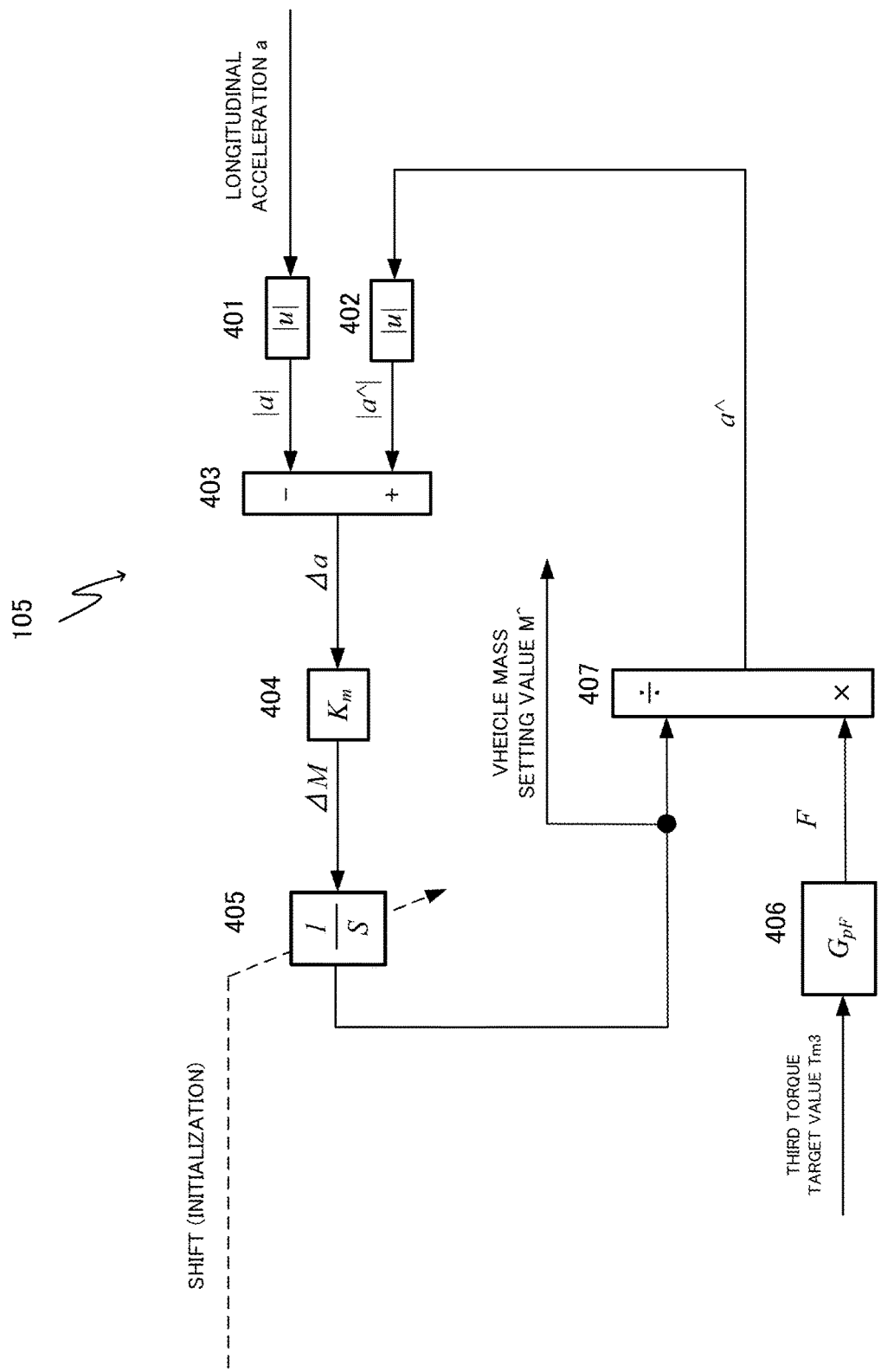
FIG. 11 is a block diagram for realizing calculation processing of the mass setting value.

FIG. 11 is a diagram showing details of the vehicle mass setter 105. With reference to FIG. 11, the vehicle mass setter 105 includes a sensor signal processing unit 401, an acceleration estimation unit 402, an acceleration change amount calculation unit 403, a correction mass calculation unit 404, a vehicle mass setting unit 405, a driving force computing unit 406, and an acceleration computing unit 407.

The sensor signal processing unit 401 receives an output value from a sensor (not shown) provided in the vehicle. The sensor in the present embodiment is a sensor that acquires a longitudinal acceleration a of the vehicle, for example, an acceleration sensor. When the longitudinal acceleration a, which is a detection value of the sensor, is input, the sensor signal processing unit 401 calculates an absolute value thereof and outputs the absolute value to the acceleration change amount calculation unit 403.

When a longitudinal acceleration estimated value a" calculated by the acceleration computing unit 407 to be described later is input, the acceleration estimation unit 402 calculates an absolute value thereof, and outputs the absolute value to the acceleration change amount calculation unit 403.

The acceleration change amount calculation unit 403 computes an acceleration difference Aa, which is a difference between the input absolute value of the longitudinal acceleration a and the absolute value of the longitudinal acceleration estimated value a".

The correction mass calculation unit 404 receives acceleration difference Aa computed by the acceleration change amount calculation unit 403. The correction mass calculation unit 404 calculates a correction mass ΔM by multiplying the input acceleration difference Aa by a mass setting gain Km. The gain Km is obtained in advance, for example, by simulation or the like, and is stored in a table format as a value associated with the acceleration difference Aa and the correction mass ΔM.

The vehicle mass setting unit 405 receives the correction mass ΔM output from the correction mass calculation unit 404. The vehicle mass setting unit 405 computes the vehicle mass estimated value M^ by adding the received correction mass ΔM for each computation.

The driving force computing unit 406 receives the third torque target value Tm3. The driving force computing unit 406 computes the driving force F by applying the transmission characteristic Gpf(s) to the received third torque target value Tm3.

The acceleration computing unit 407 calculates the longitudinal acceleration estimated value a" as an estimated value of the longitudinal acceleration based on the vehicle mass estimated value M^ from the vehicle mass setting unit 405 and the driving force F from the driving force computing unit 406. Specifically, the longitudinal acceleration estimated value a" is derived by dividing the driving force F by the vehicle mass estimated value M^. The longitudinal acceleration estimated value a" is input to the acceleration estimation unit 402 as described above, and is used for the computation of the acceleration difference Aa. In this way, the acceleration difference Aa can be computed at all times during traveling, and the correction mass ΔM can also be computed at all times during traveling.

In addition, as indicated by a broken line, in the above computing process of the vehicle mass estimated value M^, the vehicle mass estimated value M^ may be initialized according to a predetermined operation of the driver performed before the total mass of the electric vehicle changes.

As the predetermined operation, for example, when a shift operation for switching a shift lever to a P range or parking is performed, the vehicle mass setting unit 405 may initialize the vehicle mass estimated value M^ in response to the predetermined operation. After the driver performs such an operation, there is a high possibility that the vehicle mass estimated value M^ changes, for example, when the driver stops the vehicle and the occupant gets on and off. Therefore, the controller 2 may detect a possibility that a total mass M of the vehicle changes based on such an operation of the driver, and may initialize the vehicle mass estimated value M^ before the vehicle mass estimated value M^ changes. As a result, even if the vehicle mass estimated value M^ changes, a vehicle mass estimated value M^ after the change can be appropriately estimated based on the longitudinal acceleration a. The predetermined operation is not limited to such a shift operation, and may be, for example, an operation such as turning off IGN, removing a seat belt, or opening a back door.

Referring back to FIG. 7, the description will be continued. The subtractor 103 calculates the second torque target value Tm2 by subtracting the disturbance torque estimated value Td acquired from the disturbance torque estimator 102 from the vehicle body speed F/B torque Tω acquired from the vehicle body speed F/B torque setter 101.

The torque comparator 104 compares magnitudes of the first torque target value Tm1 and the second torque target value Tm2, and sets a torque target value having a larger value to the third torque target value Tm3. The second torque target value Tm2 is smaller than the first torque target value Tm1 while the vehicle is traveling, and becomes larger than the first torque target value Tm1 when the vehicle decelerates and is about to stop (a vehicle speed is equal to or less than a predetermined vehicle speed). Therefore, when the first torque target value Tm1 is larger than the second torque target value Tm2, the torque comparator 104 determines that the vehicle is before the stop, and sets the first torque target value Tm1 to the third torque target value Tm3.

Further, when the second torque target value Tm2 becomes larger than the first torque target value Tm1, the torque comparator 104 determines that the vehicle is about to stop, and switches the third torque target value Tm3 from the first torque target value Tm1 to the second torque target value Tm2. The second torque target value Tm2 converges to a positive torque on an uphill road, a negative torque on a downhill road, and substantially zero on a flat road in order to maintain the stopped state.

Next, the vibration damping control processing performed in step S204 of FIG. 2 will be described in detail.

Figure 12:
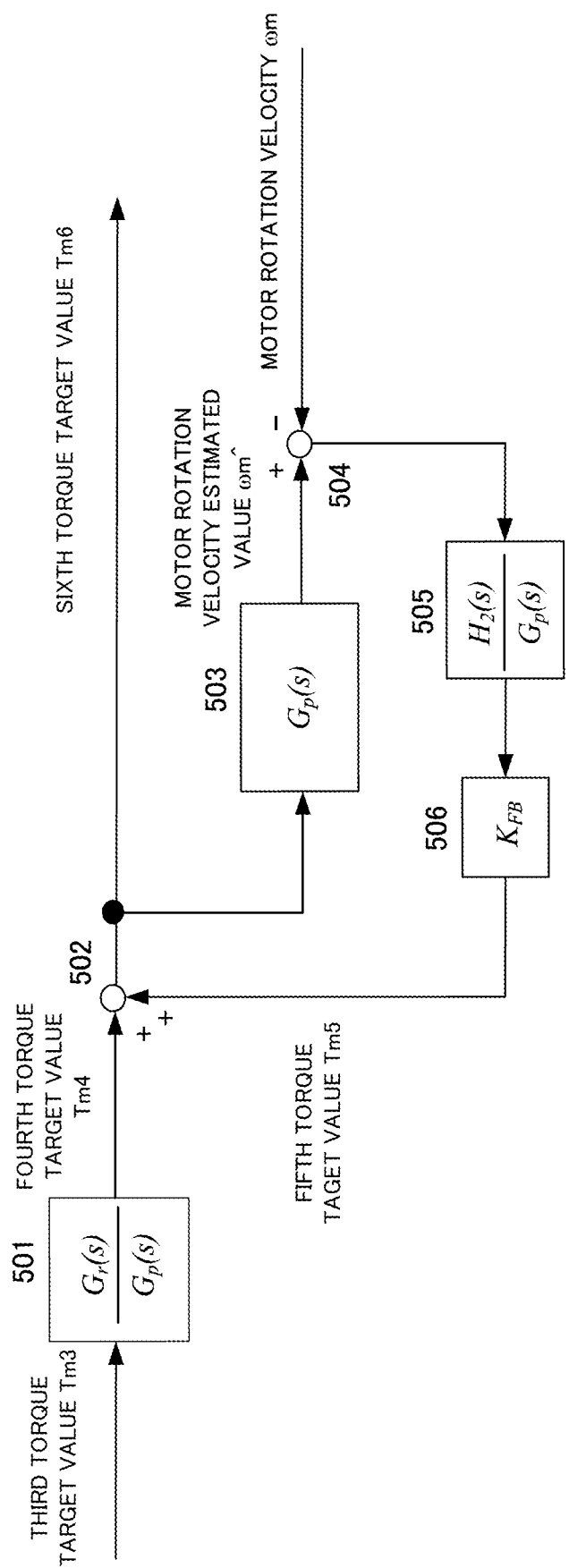
FIG. 12 is a diagram showing an example of a functional configuration for realizing vibration damping control processing.

FIG. 12 is a block diagram showing an example of a functional configuration for realizing the vibration damping control processing that prevents a vibration in the driving force transmission system of the electric vehicle. The vibration damping control processing is realized by a combination of an F/F compensator and an F/B compensator.

FIG. 12 shows a control block 501 as the F/F compensator, and an adder 502, a control block 503, a subtractor 504, a control block 505, and a multiplier 506 as the F/B compensator.

The control block 501 functions as a filter having a transmission characteristic of $Gr(s)/Gp(s)$, and calculates a fourth torque target value Tm4 by inputting the third torque target value Tm3 and performing filtering processing for reducing a torsional vibration of the electric vehicle.

In transmission characteristics of the control block 501, $Gp(s)$ constituting a denominator is the vehicle model $Gp(s)$ in the equation (12), and $Gr(s)$ constituting a numerator is the vehicle model in the equation (13) derived from the vehicle model Gp(s) and the vibration damping control algorithm.

The adder 502 outputs a sixth torque target value Tm6 by adding an output of the F/B compensator to the fourth torque target value Tm4 obtained by feedforward control.

The control block 503 functions as a filter having the vehicle model Gp(s). Therefore, the control block 503 calculates, by inputting the sixth torque target value Tm6 and performing filtering processing in consideration of the vehicle model Gp(s), a motor rotation velocity estimated value ωm^ indicating an estimated value of the motor rotation velocity ωm.

The subtractor 504 outputs a deviation between the motor rotation velocity estimated value ωm^ and the motor rotation velocity ωm. The subtractor 504 in the present embodiment outputs a value obtained by subtracting the motor rotation velocity ωm from the motor rotation velocity estimated value ωm^ to the control block 505.

The control block 505 functions as a filter having a transmission characteristic of H2(s)/Gp(s), and calculates, by inputting a deviation of the subtractor 504 and performing filtering processing, an estimated disturbance d^ including an estimated value of a disturbance torque.

In transmission characteristics of the control block 505, Gp(s) constituting a denominator is a vehicle model derived from the vehicle model Gp(s) in the equation (12) and the vibration damping control algorithm, and H2(s) constituting a numerator is a band pass filter having a transmission characteristic serving as a feedback element that reduces only a torsional vibration of a drive system.

The multiplier 506 calculates a fifth torque target value Tm5 in consideration of a control error of the motor rotation velocity ωm by multiplying the estimated disturbance d″ from the control block 505 by a feedback gain $K_{FB}$. Then, the sixth torque target value Tm6 is calculated by adding the fifth torque target value Tm5 to the fourth torque target value Tm4* by the adder 502. The motor rotation velocity ωm is fed back to the sixth torque target value Tm6 that prevents occurrence of the torsional vibration of the electric vehicle. In this way, by feeding back the motor rotation velocity ωm to the sixth torque target value Tm6, the torsional vibration of the electric vehicle can be prevented.

Next, the transmission characteristic H2(s) of the control block 505 will be described.

Figure 13:
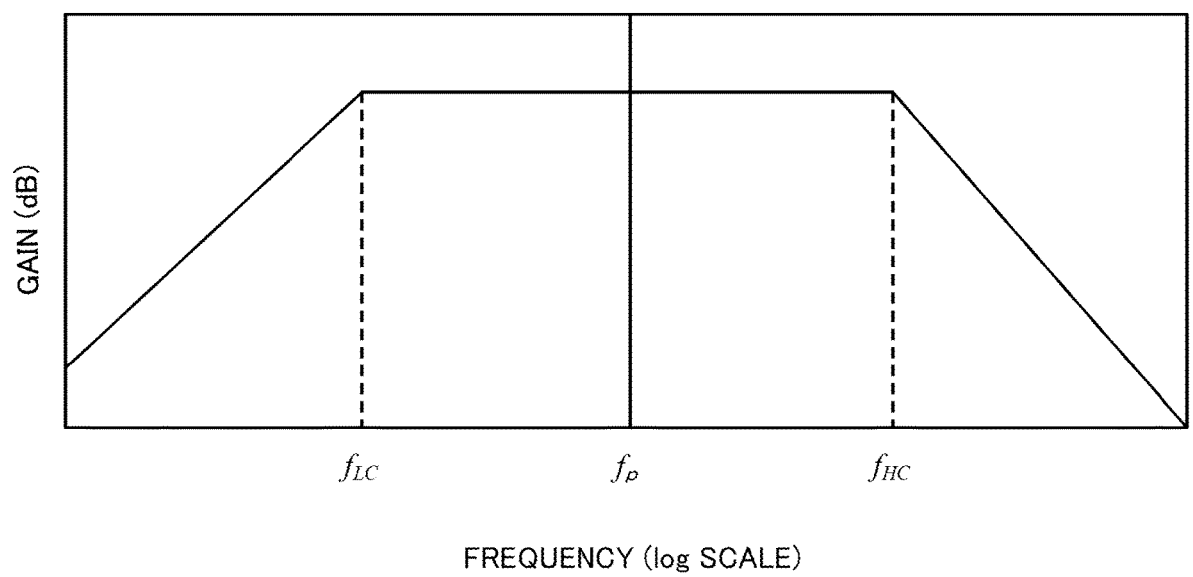
FIG. 13 is a diagram showing an example of a band pass filter.

FIG. 13 is a diagram showing an example of a band pass filter for realizing the transmission characteristic H2(s). A greatest effect can be obtained by setting characteristics of the filter as shown in the figure.

That is, the transmission characteristic H2(s) is set such that an attenuation characteristic on a low-pass side and an attenuation characteristic on a high-pass side substantially coincide with each other, and a torsional resonance frequency of the drive system is near a center of a pass band on a logarithmic axis (log scale).

For example, when the transmission characteristic H2(s) is configured by using a first-order high-pass filter and a first-order low-pass filter, the transmission characteristic H2(s) is represented by the following equation (20), a frequency fp is set to the torsional resonance frequency of the drive system, and k is set to any value.

[Equation 20]

$$H_2(s) = \frac{\tau_H s}{(1 + \tau_H s) \cdot (1 + \tau_L s)} \quad (20)$$

However, $\tau_L = 1/(2\pi f_{HC})$, $f_{HC} = k \cdot f_p$, $\tau_H = 1/(2\pi f_{LC})$, $f_{LC} = f_p/k$. In the present embodiment, a torsional vibration is generated in the driving force transmission system of the electric vehicle, and thus an example in which the stop control and the vibration damping control are used in combination has been described, but the example can also be omitted. In this case, the third torque target value Tm3 becomes the final torque command value Tmff*.

Hereinafter, regarding an effect when the control method for the electric vehicle according to the present embodiment is applied to an electric automobile, a control result when the stop control is executed on a flat road will be described with reference to FIGS. 14 and 15.

Figure 14:
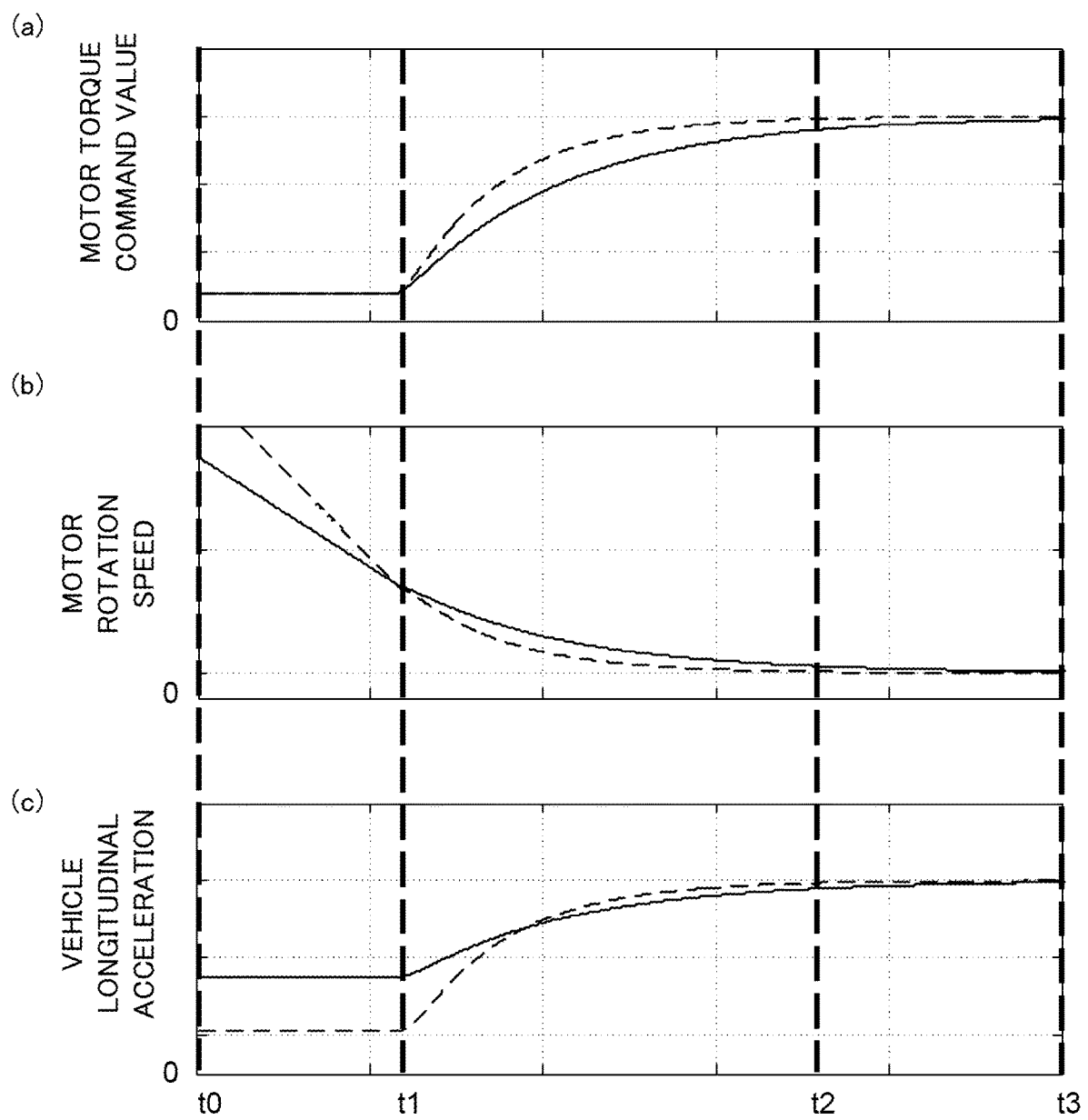
FIG. 14 is a diagram showing a comparative example of transmission characteristics used in the vibration damping control processing.

FIG. 14 is a time chart showing, as a comparative example, an example of a control result by stop control in the related art, that is, stop control when the total mass M of the vehicle is not estimated and a torque command value is not calculated according to the estimated total mass M. FIG. 15 is a time chart showing an example of a control result of the stop control in the present embodiment when the stop control is performed based on the vehicle mass estimated value M^ which is an estimated value of the total mass of the vehicle.

Figure 15:
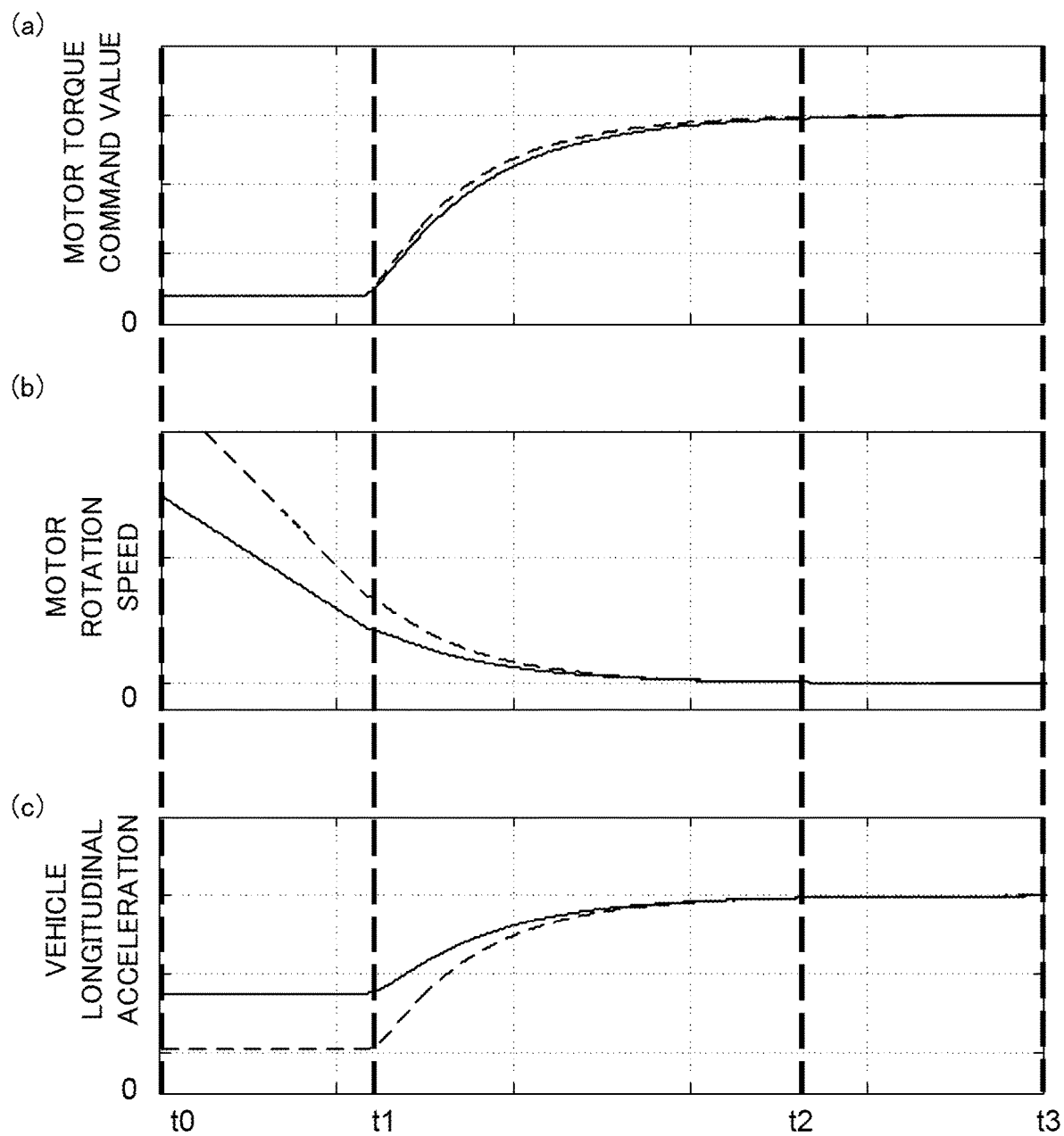
FIG. 15 is a diagram showing an example of a control result by a control device for the electric vehicle according to the present embodiment.

In FIGS. 14 and 15, (a) indicates the third torque target value Tm3 as a final torque command value corresponding to a motor torque command value, and (b) indicates a motor rotation speed, and (c) indicates a vehicle longitudinal acceleration. Horizontal axes of (a) to (c) are common time axes.

Further, a broken line in each figure is a line indicating stop control when the design mass Mini of the vehicle and an actual total mass of the vehicle match. Meanwhile, a solid line in each figure is a line indicating stop control when the actual total mass of the vehicle is larger than the design mass Mini of the vehicle. Each stop control starts at time t1.

As indicated by the solid line in FIG. 14(a), which is the example in the related art, when the total mass M of the vehicle increases by the correction mass ΔM, a motor rotation speed gradually converges to zero from the time t1 to time t3 as indicated by the solid line in FIG. 14(b). Meanwhile, as indicated by the broken line in this figure, when the total mass M of the vehicle does not change from the design mass Mini, a motor rotation speed gradually converges to zero from the time t1 to time t2.

In this way, in the related art, an angular velocity feedback gain is a constant value even if the total mass of the vehicle increases, and thus it can be seen that a time to convergence is longer as compared with a case where a change indicated by the broken line occurs where the total mass of the vehicle does not change.

In contrast, according to the stop control of the electric vehicle to which the present embodiment is applied, as indicated by the solid line in FIG. 15(a), even when the total mass M of the vehicle increases with respect to the design mass Mini, a motor rotation speed gradually converges to zero from the time t1 to the time t2. In the present embodiment, the angular velocity feedback gain is adjusted as the total mass M of the vehicle increases, and thus a control error during the stop control is smaller than that of the related art in FIG. 14. Therefore, even if the total mass M of the vehicle increases, it is possible to stop the vehicle at the same timing as when the total mass of the vehicle and the design mass Mini match.

As a result, a period from the start of the stop control processing to the convergence of the motor rotation velocity ωm to zero can be shortened from the time t3 to the time t2 as indicated by the solid line in FIG. 15(b) while preventing a sharp change in a vehicle longitudinal acceleration as indicated in FIG. 15(c).

That is, the motor controller 2 in the present embodiment can realize a stop distance intended by the driver while ensuring stability of a feedback control system. Therefore, according to the present embodiment, a stop distance of the electric vehicle can be shortened, and smooth stopping can be realized.

In this way, according to the present embodiment, a time from when the vehicle is about to stop to the stop and a behavior of the vehicle when the vehicle is about to stop can be matched regardless of the total mass of the vehicle. That is, even when the total mass of the electric vehicle changes, the stop distance of the electric vehicle can be prevented from becoming long, and the electric vehicle can be stopped smoothly.

In the present embodiment, the parameters acquired by the sensors provided in the vehicle are not limited to the above longitudinal acceleration a, and may be various parameters related to the change in the total mass M. For example, the vehicle body speed V or the driving force F may be used instead of the longitudinal acceleration a. In this case, the vehicle mass estimated value M^ may be calculated after calculating the longitudinal acceleration a and an estimated acceleration a" from the vehicle body speed V or the driving force F, or the vehicle mass estimated value M^ may be calculated by computing parameters other than the accelerations a and a" from the vehicle body speed V or the driving force F. In this way, types of the parameters can be changed as appropriate.

According to the embodiment of the present invention, the following effects are produced.

The control method for the electric vehicle according to the present embodiment is a control method for an electric vehicle in which the electric motor 4 is used as a traveling drive source and deceleration is performed by the regenerative braking force of the electric motor 4. The control method includes: acquiring an accelerator operation amount; acquiring (estimating) the total mass M^ of the electric vehicle; estimating the disturbance torque acting on the electric vehicle; acquiring an angular velocity of a rotary body correlated with a rotation velocity of the driving shaft 8 for driving the electric vehicle; estimating the vehicle body speed of the electric vehicle by using the transmission characteristic Gp(s) from the angular velocity of the rotary body to a speed of the electric vehicle; calculating the second torque target value Tm2 (torque specified value) for the electric motor 4 based on the acquired total mass M^ of the electric vehicle; and controlling, based on the second torque target value Tm2, a torque generated in the electric motor 4. The control method further includes: converging the second torque target value Tm2 to the disturbance torque Td as the estimated vehicle body speed V decreases, when the accelerator operation amount is equal to or less than a predetermined value and the electric vehicle stops.

In this way, in the control method according to the present embodiment, a second torque command value Tm2* is calculated based on the total mass M^ to control the torque generated in the electric motor 4, and thus the electric motor 4 can be controlled according to the total mass M^ of the vehicle. Therefore, even when the total mass of the electric vehicle changes, the time from when the vehicle is about to stop to the stop and the behavior of the vehicle when the vehicle is about to stop can be matched with normative responses when the total mass of the vehicle is the same as the design mass Mini, and thus the stop distance of the electric vehicle can be prevented from becoming long. Further, when the electric vehicle stops, the second torque command value Tm2* converges to the disturbance torque Td as the vehicle body speed V decreases, and thus always smooth deceleration without acceleration vibration on a flat road, an uphill road, and a downhill road can be realized when the vehicle is about to stop, and the stopped state can be maintained.

Further, in the control method for the electric vehicle according to the present embodiment, the vehicle body speed feedback torque Tω is calculated by multiplying the estimated vehicle body speed V^ by the predetermined gain Kvref. The second torque target value Tm2 (torque command value) is calculated based on the vehicle body speed feedback torque Tω. Then, the predetermined gain Kvref is set according to the total mass M^ of the electric vehicle.

In this way, the vehicle body speed feedback torque Tω is computed according to the total mass M^, and thus the second torque command value Tm2*, which is determined based on the vehicle body speed feedback Tω, is also appropriately calculated according to the total mass M^ of the vehicle. As a result, even when a total mass of the electric vehicle changes, the torque calculated based on the transmission characteristic Gp(s) can be prevented from deviating from an actual torque of the vehicle, and thus stop control suitable for the total mass M^ of the vehicle can be realized.

Further, in the control method for the electric vehicle according to the present embodiment, the predetermined gain Kvref is set to be large as the total mass M of the electric vehicle increases.

As described in FIG. 8, by increasing the gain Kvref as the total mass M of the vehicle increases, the vehicle body speed F/B torque Tω can be adjusted to an appropriate value according to the total mass M^ of the vehicle. As a result, the torque calculated based on the transmission characteristic Gp(s) can be prevented more reliably from deviating from the actual torque of the vehicle, and thus the stop control more suitable for the total mass M^ of the vehicle can be realized.

Further, in the control method for the electric vehicle according to the present embodiment, a parameter correlated with the total mass of the electric vehicle is acquired, and the total mass M^ of the electric vehicle is estimated based on the acquired parameter.

According to the present embodiment, even if the total mass of the electric vehicle is not directly measured, a predetermined parameter correlated with the total mass of the electric vehicle can be acquired, and the total mass M^ can be indirectly obtained based on the predetermined parameter. Therefore, it is not necessary to separately provide a device for directly measuring the mass in the electric vehicle, the total mass M^ of the electric vehicle can be estimated by a simple configuration.

Further, in the control method for the electric vehicle according to the present embodiment, the parameter is the longitudinal acceleration a of the electric vehicle, and the total mass M^ of the electric vehicle is estimated based on an acquired longitudinal acceleration a of the electric vehicle and the second torque target value Tm2 (third torque target value Tm3).

As described with reference to FIG. 11, the correction mass ΔM as an amount of change in the total mass M of the vehicle is obtained based on a longitudinal acceleration a of the vehicle acquired by an acceleration sensor of the vehicle. The acceleration a can be obtained, for example, by the acceleration sensor that is easily attached to the vehicle.

Further, according to the control method for the electric vehicle according to the present embodiment, the total mass M^ of the electric vehicle is initialized according to the predetermined operation performed before the total mass of the electric vehicle changes.

For example, when there is a computation error of the computed vehicle mass estimated value M^, an integration error can be reset, and thus the vehicle mass estimated value M^ can be estimated accurately. As a result, the stop control suitable for the total mass M^ of the vehicle can always be realized.

Second Embodiment

Next, a control method for a vehicle according to the second embodiment will be described. In the second embodiment, a configuration of a vehicle mass setter 106 for setting the total mass M of the vehicle is different from that of the first embodiment. Hereinafter, the difference will be described in detail.

Figure 16:
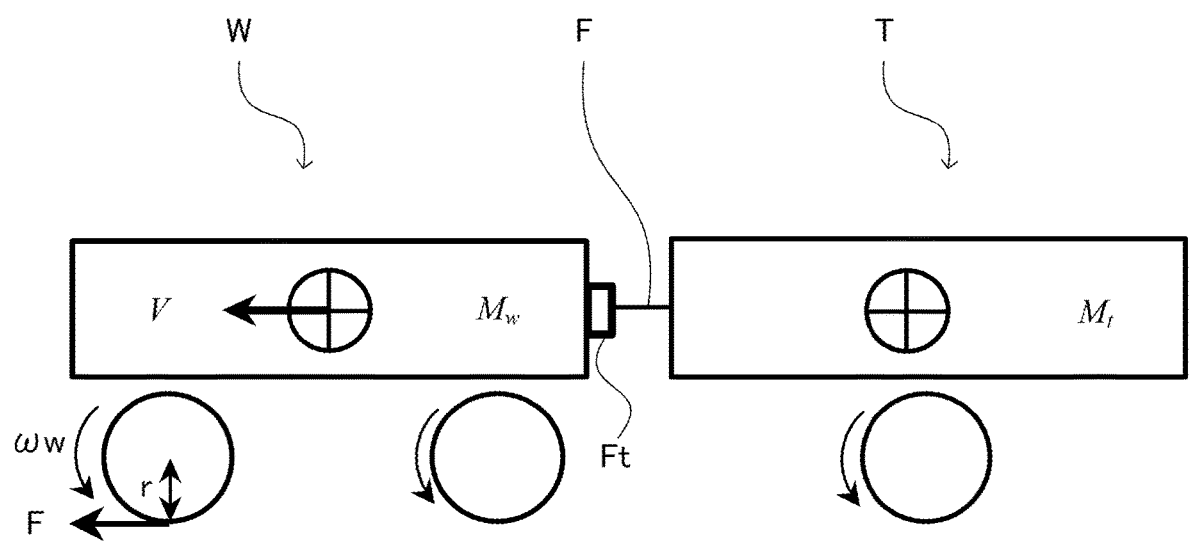
FIG. 16 is a diagram obtained by modeling a driving force transmission system of a vehicle according to a second embodiment.

FIG. 16 is a diagram obtained by modeling a driving force transmission system of the vehicle. In the second embodiment, as an example, the case where a vehicle W tows the trailer T will be described. The vehicle W and the trailer T are connected by a trailer hitch F as a towing unit, and the trailer hitch F is provided with a trailer hitch load sensor Ft for detecting a weight acting on the vehicle when the vehicle W tows the trailer T.

Further, in the present embodiment, suspensions corresponding to respective wheels of the vehicle W, specifically, the left and right drive wheels 9a and 9b (see FIG. 1) and left and right rear wheels (not shown), and four suspension stroke sensors FR, FL, RR, and RL for detecting respective stroke amounts of these suspensions are provided.

Each parameter in FIG. 16 is as shown below.

M: Total mass including vehicle W and trailer T
Mc: Mass of vehicle W
Mt: Mass of trailer T (including driven wheel equivalent mass of trailer (vehicle wheel inertia))
Ft: Trailer hitch load sensor Here, assuming that the vehicle W and the trailer T are connected by a rigid body, the total mass M of the vehicle is represented by the following equation (21).

[Equation 21]

$$M = M_c \pm M_t \tag{21}$$

Further, a relation between a driving force F and the trailer hitch load sensor Ft is represented by the following equation (22) when the vehicle W is accelerated or decelerated by the driving force F.

[Equation 22]

$$F_t = \frac{M_c}{M} \cdot F \tag{22}$$

The total mass M of the vehicle from the above equations (21) and (22) is represented by the following equation (23).

[Equation 23]

$$M = \left(1 + \frac{F_t}{F - F_t}\right) \cdot M_c \tag{23}$$

Figure 17:
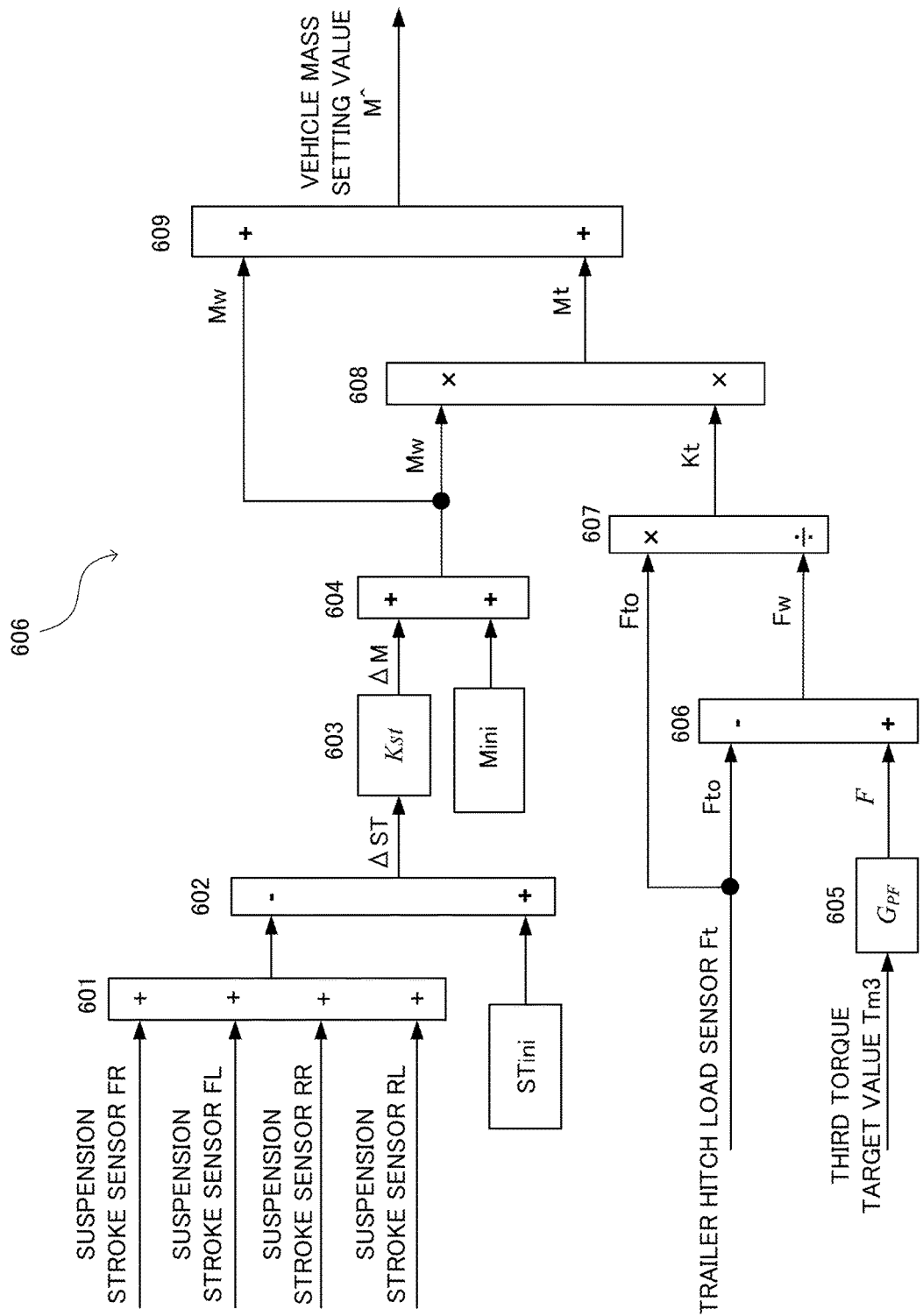
FIG. 17 is a block diagram for realizing calculation processing of a vehicle mass setting value.

Next, the vehicle mass setter 106 according to the present embodiment will be described. FIG. 17 is a diagram showing details of the vehicle mass setter 106. The vehicle mass setter 106 includes a total stroke amount computing unit 601, a suspension stroke change amount computing unit 602, a vehicle increase mass computing unit 603, a vehicle mass computing unit 604, a driving force computing unit 605, a vehicle driving force computing unit 606, a towing force ratio computing unit 607, a towing mass computing unit 608, and a total mass computing unit 609.

Firstly, computing processing of a vehicle mass Mc of the vehicle W will be described. The total stroke amount computing unit 601 adds outputs of the four suspension stroke sensors FR, FL, RR, and RL, and calculates a total stroke amount ST applied to the suspensions corresponding to all the drive wheels in the vehicle W, respectively. The total stroke amount is acquired, for example, by a pressure sensor attached to a suspension mount or a stroke amount sensor.

The suspension stroke change amount computing unit 602 receives the total stroke amount ST computed in the total stroke amount computing unit 601, and a design mass stroke amount STini as a total value of stroke amounts of the four wheels defined in advance by the design mass Mini. The suspension stroke change amount computing unit 602 calculates, by subtracting the total stroke amount ST from the design mass stroke amount STini, a stroke change amount ΔST as a suspension stroke amount that has been sunk under an influence of an increase in mass from the design mass Mini of the vehicle W.

The vehicle increase mass computing unit 603 calculates a mass change amount ΔMc of the vehicle W by multiplying, by a spring constant Kst (N/mm) of a spring constituting the suspension, the stroke change amount ΔST calculated by the suspension stroke change amount computing unit 602.

The vehicle mass computing unit 604 calculates the vehicle mass Mc of the vehicle W by receiving and adding the design mass Mini of the vehicle W and the vehicle mass change amount ΔM calculated by the vehicle increase mass computing unit 603. In this way, the vehicle mass Mc of the vehicle W is calculated using signals from the suspension stroke sensors FR, FL, RR, and RL indicating the suspension stroke amount.

Next, computing processing of a trailer mass Mt of the trailer T will be described. The driving force computing unit 605 receives a third torque target value Tm3 and calculates the driving force F using the equation (16).

The vehicle driving force computing unit 606 receives the driving force F of the vehicle W calculated by the driving force computing unit 605 and a towing force Fto which is a detection value of the weight of the trailer hitch load sensor Ft. The towing force Fto here is a value corresponding to a force for towing the trailer T by the vehicle W. The vehicle driving force computing unit 606 calculates, by subtracting the towing force Fto from the driving force F, a vehicle driving force Fw as a force for driving the vehicle W.

The towing force ratio computing unit 607 receives the towing force Fto from the trailer hitch load sensor Ft, and the vehicle driving force Fw calculated by the vehicle driving force computing unit 606. The towing force ratio computing unit 607 calculates, by dividing the vehicle driving force Fw with respect to the towing force Fto, a ratio Kt of the towing force Fto with respect to the vehicle driving force Fw.

The towing mass computing unit 608 receives the ratio Kt calculated by the towing force ratio computing unit 607, and the vehicle mass Mc of the vehicle W calculated by the vehicle mass computing unit 604. The towing mass computing unit 608 calculates the trailer mass Mt as a mass of the trailer T by multiplying the vehicle mass Mc of the vehicle by the ratio Kt.

The total mass computing unit 609 calculates a vehicle mass estimated value M^ as a total mass of the vehicle W and the trailer T by adding the vehicle mass Mc calculated by the vehicle mass computing unit 604 and the trailer mass Mt calculated by the towing mass computing unit 608.

In this way, in the present embodiment, the trailer mass Mt is estimated using the third torque target value Tm3 and the detection value of the trailer hitch load sensor Ft. Then, the vehicle mass estimated value M^ is calculated by correcting the vehicle mass Mc of the vehicle using this trailer mass Mt. As in the first embodiment, the controller 2 may initialize the vehicle mass estimated value M^ when a signal indicating that a shift operation is performed by a driver is detected.

When no trailer is connected, a total mass M^ of the vehicle can be estimated using the suspension stroke sensors FR, FL, RR, and RL without a need for a load sensor. In this case, Mc output from the vehicle mass computing unit 604 is calculated as the total mass M^ of the vehicle.

With the above configuration, according to the present embodiment, the same control results as those in FIGS. 14 and 15 described in the first embodiment can be obtained.

According to the above embodiment, the following effects are produced.

In the control method for the electric vehicle according to the present embodiment, the parameters are the stroke amounts of the suspensions provided in the electric vehicle, and the total mass M^ of the electric vehicle is estimated based on the acquired stroke amounts.

With such a configuration, the vehicle mass estimated value M^ can also be appropriately estimated by indirectly calculating the vehicle mass change amount ΔM based on the parameters indicating the stroke amounts of the suspension stroke sensors FR, FL, RR, and RL.

In the control method for the electric vehicle according to the present embodiment, the electric vehicle W further includes the trailer hitch (towing unit) F for towing the trailer T (separate object), and the electric vehicle W measures a load applied to the trailer hitch F when towing the trailer T. Further, when towing the trailer T, the electric vehicle W corrects the total mass M^ of the electric vehicle based on the load Fto applied to the trailer hitch F and a second torque target value (torque command value) Tm2.

With such a configuration, even when the vehicle W tows the trailer T or the like, the total mass M^ of the vehicle can be accurately estimated, and stop control suitable for the total mass M^ of the vehicle can be realized.

The embodiments of the present invention have been described above, but the above embodiments are only a part of application examples of the present invention, and are not intended to limit the technical scope of the present invention to the specific configurations of the above embodiments. Further, the above embodiments can be appropriately combined as long as there is no contradiction. For example, the control method for the electric vehicle according to the first embodiment can also be applied to the vehicle to which the trailer shown in FIG. 16 is connected. In this case, the total mass of the vehicle to which the trailer is connected can be calculated based on the longitudinal acceleration sensor a by the same method as that described with reference to FIG. 8. Further, in the above embodiments, the total mass M^ is estimated based on a predetermined parameter, but the total mass M^ may be measured by providing a configuration capable of directly measuring a mass. For example, the total mass M^ may be directly measured by a method such as providing sensors capable of measuring a mass on the above suspensions. In this way, the total mass M^ is obtained by various methods.

The invention claimed is:

1. A control method for an electric vehicle in which a motor is used as a traveling drive source and deceleration is performed by a regenerative braking force of the motor, the electric vehicle comprising a towing unit configured to tow a separate object, the method comprising:
   acquiring an accelerator operation amount;
   acquiring a total mass of the electric vehicle;
   estimating a disturbance torque acting on the electric vehicle;
   acquiring an angular velocity of a rotary body correlated with a rotation velocity of a driving shaft for driving the electric vehicle;
   estimating a vehicle body speed of the electric vehicle by using a transmission characteristic from the angular velocity of the rotary body to a speed of the electric vehicle;
   calculating a vehicle body speed feedback torque by multiplying the estimated vehicle body speed by a predetermined gain, the predetermined gain being set according to the total mass of the electric vehicle;
   calculating a torque command value for the motor based on the acquired total mass of the electric vehicle and the vehicle body speed feedback torque;
   measuring a load applied to the towing unit when the electric vehicle tows the separate object;
   correcting the total mass of the electric vehicle based on the measured load applied to the towing unit and the torque command value when the electric vehicle tows the separate object;
   controlling a torque generated in the motor based on the torque command value; and
   converging the torque command value to the disturbance torque as an estimated vehicle body speed decreases, when the accelerator operation amount is equal to or less than a predetermined value and the electric vehicle stops.

2. The control method for the electric vehicle according to claim 1, wherein:
   the predetermined gain is set to be large as the total mass of the electric vehicle increases.

3. The control method for the electric vehicle according to claim 1, further comprising:
   acquiring a parameter correlated with the total mass of the electric vehicle; wherein:
   the total mass of the electric vehicle is estimated based on the acquired parameter.

4. The control method for the electric vehicle according to claim 3, wherein:
   the parameter is a longitudinal acceleration of the electric vehicle, and
   the total mass of the electric vehicle is estimated based on the acquired longitudinal acceleration of the electric vehicle and the torque command value.

5. The control method for the electric vehicle according to claim 3, wherein:

the parameter is a stroke amount of a suspension provided on a wheel of the electric vehicle, and the total mass of the electric vehicle is estimated based on the acquired stroke amount.

6. The control method for the electric vehicle according to claim 1, wherein:

the total mass of the electric vehicle is initialized in accordance with a predetermined operation performed before the total mass of the electric vehicle changes.

7. A control device for an electric vehicle that comprises a towing unit configured to tow a separate object, the control device comprising:

a motor; and a controller configured to control the motor, wherein the controller is configured to:

acquire an accelerator operation amount;

acquire a total mass of the electric vehicle;

estimate a disturbance torque acting on the electric vehicle;

acquire an angular velocity of a rotary body correlated with a rotation velocity of a driving shaft for driving the electric vehicle;

estimate a vehicle body speed of the electric vehicle by using a transmission characteristic from the angular velocity of the rotary body to a speed of the electric vehicle;

calculate a vehicle body speed feedback torque by multiplying the estimated vehicle body speed by a predetermined gain, the predetermined gain being set according to the total mass of the electric vehicle;

calculate a torque command value for the motor based on an acquired total mass of the electric vehicle and the vehicle body speed feedback torque;

acquire a load applied to the towing unit when the electric vehicle tows the separate object;

correct the total mass of the electric vehicle based on the measured load applied to the towing unit and the torque command value when the electric vehicle tows the separate object;

control a torque generated in the motor based on the torque command value; and converge the torque command value to the disturbance torque as an estimated vehicle body speed decreases, when the accelerator operation amount is equal to or less than a predetermined value and the electric vehicle stops.

8. The control device according to claim 7, wherein:

the predetermined gain is set to be large as the total mass of the electric vehicle increases.

9. The control device according to claim 7, wherein the controller is configured to:

acquire a parameter correlated with the total mass of the electric vehicle; wherein:

the total mass of the electric vehicle is estimated based on the acquired parameter.

10. The control device according to claim 9, wherein:

the parameter is a longitudinal acceleration of the electric vehicle, and the total mass of the electric vehicle is estimated based on the acquired longitudinal acceleration of the electric vehicle and the torque command value.

11. The control device according to claim 9, wherein:

the parameter is a stroke amount of a suspension provided on a wheel of the electric vehicle, and the total mass of the electric vehicle is estimated based on the acquired stroke amount.

12. The control device according to claim 7, wherein:

the total mass of the electric vehicle is initialized in accordance with a predetermined operation performed before the total mass of the electric vehicle changes.

* * * * *